US011003891B2

(12) United States Patent
Chen

(10) Patent No.: US 11,003,891 B2
(45) Date of Patent: May 11, 2021

(54) IMAGE PROCESSING METHOD AND APPARATUS, AND ELECTRONIC DEVICE

(71) Applicant: GUANGDONG OPPO MOBILE TELECOMMUNICATIONS CORP., LTD., Guangdong (CN)

(72) Inventor: Deyin Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 4 days.

(21) Appl. No.: 16/132,340

(22) Filed: Sep. 14, 2018

(65) Prior Publication Data
US 2019/0188452 A1 Jun. 20, 2019

(30) Foreign Application Priority Data

Dec. 15, 2017 (CN) .......................... 201711354302.9

(51) Int. Cl.
*G06K 9/00* (2006.01)
*G06T 7/73* (2017.01)
(Continued)

(52) U.S. Cl.
CPC ..... *G06K 9/00228* (2013.01); *G06K 9/00221* (2013.01); *G06K 9/00288* (2013.01);
(Continued)

(58) Field of Classification Search
CPC .......... G06K 9/00228; G06K 9/00221; G06K 9/00288; G06K 9/6202; G06K 9/6218;
(Continued)

(56) References Cited

U.S. PATENT DOCUMENTS

| 5,838,839 | A | * | 11/1998 | Seki | ..................... G06K 9/6202 382/299 |
| 2009/0141940 | A1 | * | 6/2009 | Zhao | ........................ G06T 7/40 382/103 |
| 2013/0141458 | A1 | * | 6/2013 | Lee | ........................ G06F 3/048 345/629 |

FOREIGN PATENT DOCUMENTS

| CN | 101697197 | 4/2010 |
| CN | 102063610 | 5/2011 |

(Continued)

OTHER PUBLICATIONS

Liang et al., "Face Detection Based on Template Matching and Support Vector Machines," Chinese Journal of Computers, Jan. 2002, vol. 25, No. 1, 8 pages.

(Continued)

*Primary Examiner* — Wednel Cadeau
(74) *Attorney, Agent, or Firm* — Hodgson Russ LLP

(57) ABSTRACT

The present disclosure relates to an image processing method and apparatus, and an electronic device. The method includes: acquiring a first face coordinate of a first image; acquiring a second face coordinate of a second image, in which, the first image has a different resolution from the second image, and an image size of the first image is greater than an image size of the second image; calculating a magnification ratio according to the image size of the first image and the image size of the second image, and calculating a second target face coordinate according to the magnification ratio and the second face coordinate; comparing the first face coordinate with the second target face coordinate to obtain a comparing result; and performing face clustering according to the comparing result.

19 Claims, 12 Drawing Sheets

(51) Int. Cl.
    *G06K 9/62* (2006.01)
    *G06T 3/40* (2006.01)
    *G06T 7/60* (2017.01)
(52) U.S. Cl.
    CPC ......... *G06K 9/6202* (2013.01); *G06K 9/6218* (2013.01); *G06T 3/40* (2013.01); *G06T 7/60* (2013.01); *G06T 7/74* (2017.01); *G06K 9/00677* (2013.01); *G06T 2207/30201* (2013.01)

(58) Field of Classification Search
    CPC ......... G06K 9/00677; G06T 7/74; G06T 3/40; G06T 7/60; G06T 2207/30201
    USPC ....................................................... 382/118
    See application file for complete search history.

(56) References Cited

FOREIGN PATENT DOCUMENTS

| | | |
|---|---|---|
| CN | 106355573 | 1/2017 |
| CN | 106648344 | 5/2017 |
| CN | 107967677 | 4/2018 |

OTHER PUBLICATIONS

Xiao, "Face Recognition on Low-Resolution Images Based on Unified Feature Space," Dissertation for the Master Degree in Engineering, Harbin Institute of Technology, Jun. 2014, 71 pages.
Yang et al., "Application of an Image Magnification Method Based on Statistical Processing in Face Recognition," Computer Technology and Development, Dec. 2011, vol. 21, No. 12, 4 pages.
SIPO, First Office Action for CN Application No. 201711354302.9, dated Sep. 9, 2019.
WIPO, English Translation of ISR/WO for PCT/CN/2018/114976, Feb. 12, 2019.
Al et al., "Face Detection Based on Template Matching and Support Vector Machines," Proceedings 2001 International Conference on Image Processing, Oct. 2001, pp. 1006-1009.
Ayinde et al., "Region-based face detection," Pattern Recognition, The Journal of the Pattern Recognition Society, Oct. 2002, vol. 35, No. 10, pp. 2095-2107.
Jaimes et al., "Detection of Non-Identical Duplicate Consumer Photographs," Information, Communications and Signal Processing, 2003 and Fourth PAC IFIC RIM Conference on Multimedia, Dec. 2003, vol. 1, pp. 16-20.
Rowley et al., "Human Face Detection in Visual Scenes," Technical Reports, Nov. 1995, 26 pages.
EPO, Office Action for EP Application No. 18204370.3, dated May 21, 2019.
EPO, Office Action for EP Application No. 18204370.3, dated Apr. 6, 2020.
IPI, Office Action for IN Application No. 201814041872, dated Dec. 23, 2020.

* cited by examiner (1) overlapping (3) intersection (2) inclusion (4) separation

IMAGE PROCESSING METHOD AND APPARATUS, AND ELECTRONIC DEVICE

CROSS-REFERENCE TO RELATED APPLICATIONS

This application is based on and claims priority to Chinese Patent Application No. 201711354302.9, filed on Dec. 15, 2017, the entire contents of which are incorporated herein by reference.

FIELD

The present disclosure relates to a computer technology field, and more particularly to an image processing method, an image processing apparatus, a computer readable storage medium and a computer device.

BACKGROUND

With the rapid development of smart terminals, the smart terminal has complete function and improved performance. The smart terminal may be configured to collect images, perform face recognition on the collected images, and perform classification according to the face recognition results. Since, the smart terminal has a limited storage and computing capability, the smart terminal generally performs recognition classification before the classification, for example, using a simplified algorithm model, or by compressing images. Accordingly, the precision of recognition results obtained is reduced. A server has a relatively powerful storage and computing capability, and thus the smart terminal may upload the images to the server, such that the server may process the original images using an algorithm model with a higher precision, and accordingly, the precision of recognition results may be enhanced. Face data obtained by different devices from face recognition is different, and face data obtained from face recognition with different resolutions is different. In other words, for a same image, face data obtained in different devices from face recognition may be different, which results in a very low precision of the face recognition.

DISCLOSURE

Embodiments of the present disclosure provide an image processing method, an image processing apparatus, a computer readable storage medium and a computer device, which may improve an accuracy of image processing.

An image processing method includes: acquiring a first face coordinate of a first image, wherein the first face coordinate is configured to represent a position of a first face image in the first image; acquiring a second face coordinate of a second image, wherein the second face coordinate is configured to represent a position of a second face image in the second image, the first image has a different resolution from the second image, and an image size of the first image is greater than an image size of the second image; calculating a magnification ratio according to the image size of the first image and the image size of the second image, and calculating a second target face coordinate according to the magnification ratio and the second face coordinate; comparing the first face coordinate with the second target face coordinate to obtain a comparing result; and performing face clustering according to the comparing result.

An image processing apparatus includes: a first acquiring module, configured to acquire a first face coordinate of a first image, wherein the first face coordinate is configured to represent a position of a first face image in the first image; a second acquiring module, configured to acquire a second face coordinate of a second image, wherein the second face coordinate is configured to represent a position of a second face image in the second image, the first image has a different resolution from the second image, and an image size of the first image is greater than an image size of the second image; a calculating module, configured to calculate a magnification ratio according to the image size of the first image and the image size of the second image, and calculate a second target face coordinate according to the magnification ratio and the second face coordinate; a comparing module, configured to compare the first face coordinate with the second target face coordinate to obtain a comparing result; and a face clustering module, configured to perform face clustering according to the comparing result.

A computer readable storage medium is stored thereon with computer programs that, when executed by a processor, implement:

acquiring a first face coordinate of a first image, wherein the first face coordinate is configured to represent a position of a first face image in the first image;

acquiring a second face coordinate of a second image, wherein the second face coordinate is configured to represent a position of a second face image in the second image, the first image has a different resolution from the second image, and an image size of the first image is greater than an image size of the second image;

calculating a magnification ratio according to the image size of the first image and the image size of the second image, and calculating a second target face coordinate according to the magnification ratio and the second face coordinate;

comparing the first face coordinate with the second target face coordinate to obtain a comparing result; and performing face clustering according to the comparing result.

A computer device includes a memory and a processor. The memory is stored with computer readable instructions that, when executed by the processor, cause the processor to implement:

acquiring a first face coordinate of a first image, wherein the first face coordinate is configured to represent a position of a first face image in the first image;

acquiring a second face coordinate of a second image, wherein the second face coordinate is configured to represent a position of a second face image in the second image, the first image has a different resolution from the second image, and an image size of the first image is greater than an image size of the second image;

calculating a magnification ratio according to the image size of the first image and the image size of the second image, and calculating a second target face coordinate according to the magnification ratio and the second face coordinate;

comparing the first face coordinate with the second target face coordinate to obtain a comparing result; and performing face clustering according to the comparing result.

BRIEF DESCRIPTION OF THE DRAWINGS

In order to more clearly explain technical solutions in embodiments of the present disclosure or in the related art, drawings required to be used in description of embodiments of the present disclosure or of the related art is simply introduced below. Apparently, the drawings in the following description are merely embodiments of the present disclosure. For the ordinary skilled in the art, other drawings may be obtained based on these drawings without any creative work.

EMBODIMENTS OF THE PRESENT DISCLOSURE

In order to make objectives, technical solutions and advantages of the present disclosure more clear, illustration will be made below with reference to drawings and embodiments. It should be understood that, specific embodiments described herein are merely used to explain the present disclosure, but are not used to limit the present disclosure.

It is to be understood that, terms such as "first" and "second" used in the present disclosure may be used to describe various elements, but these elements are not limited by these terms. These terms are merely used to distinguish one element with another element. For example, without departing from the scope of the present disclosure, a first terminal may be referred to as a second terminal, and similarly, the second terminal may be referred to as the first terminal. Both the first terminal and the second terminal are terminals, but are not the same one.

Figure 1:
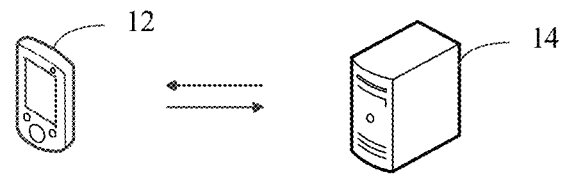
FIG. 1 is a schematic diagram of an application scenario in which an image processing method is applied, in an embodiment.

FIG. 1 is a schematic diagram of an application scenario in which an image processing method is applied, in an embodiment. As illustrated in FIG. 1, the application scenario includes a client 12 and a server 14. The client 12 is configured to acquire a first image, and upload the first image to the server 14 for storage. The server 14 performs face recognition on the first image after receiving the first image to obtain a first face coordinate corresponding to the first image, and returns the first face coordinate to the client 12. The client 12 performs compression on the first image to obtain the second image, and performs face recognition on the second image to obtain the corresponding second face coordinate. Then, the client 12 calculates a magnification ratio according to an image size of the first image and an image size of the second image, calculates a second target face coordinate according to the magnification ratio and the second face coordinate, compares the first face coordinate with the second target face coordinate to obtain a comparing result, and finally generates face image set according to the comparing result. The client 12 is the most peripheral electronic device of the computer network, which is mainly used to input user information and output processing results. For example, the client 12 may be a personal computer, a mobile terminal, a PDA (personal digital assistant), a wearable device, and the like. The server 14 is used to respond to service requests, and provide computing services, and for example, may be one or more computers.

Figure 2:
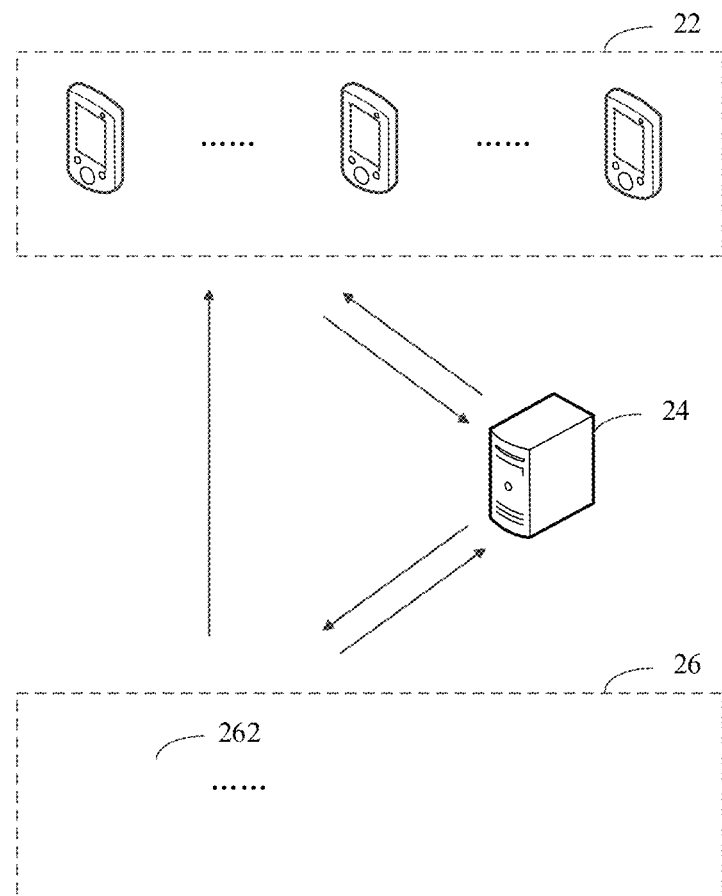
FIG. 2 is a schematic diagram of an application scenario in which an image processing method is applied, in another embodiment.

FIG. 2 is a schematic diagram of an application scenario in which an image processing method is applied, in another embodiment. As illustrated in FIG. 2, the application scenario includes a client 22, a server 24 and a sub-server cluster 26. The client 22 is configured to acquire a first image, generate a face recognition request according to the first image, and upload the face recognition request to the server 24. The server 24 generates a request queue according to received face recognition request, finds a target server identification according to status identifications of respective sub-servers 262, and sends the face recognition request in the request queue to the sub-server 262 corresponding to the target server identification for face recognition, to obtain a face recognition result including a first face coordinate. The sub-server 262 may send the face recognition result directly to the client 22, or may send the face recognition result to the server 24 such that the server 24 sends the face recognition result to the client 22. The client 22 may perform compression on the first image to obtain the second image, and perform face recognition on the second image to obtain the corresponding second face coordinate. Then, the client 22 calculates a magnification ratio according to an image size of the first image and an image size of the second image, calculates a second target face coordinate according to the magnification ratio and the second face coordinate, compares the first face coordinate with the second target face coordinate to obtain a comparing result, and finally generates face image set according to the comparing result. The sub-server cluster 26 includes one or more sub-servers 262, for achieving distributed task processing. The client 22 is the most peripheral electronic device of the computer network, which is mainly used to input user information and output processing results. For example, the client 22 may be a personal computer, a mobile terminal, a PDA (personal digital assistant), a wearable device, and the like. The server 24 and the sub-server 262 are used to respond to service requests, and provide computing services, and for example, may be one or more computers.

Figure 3:
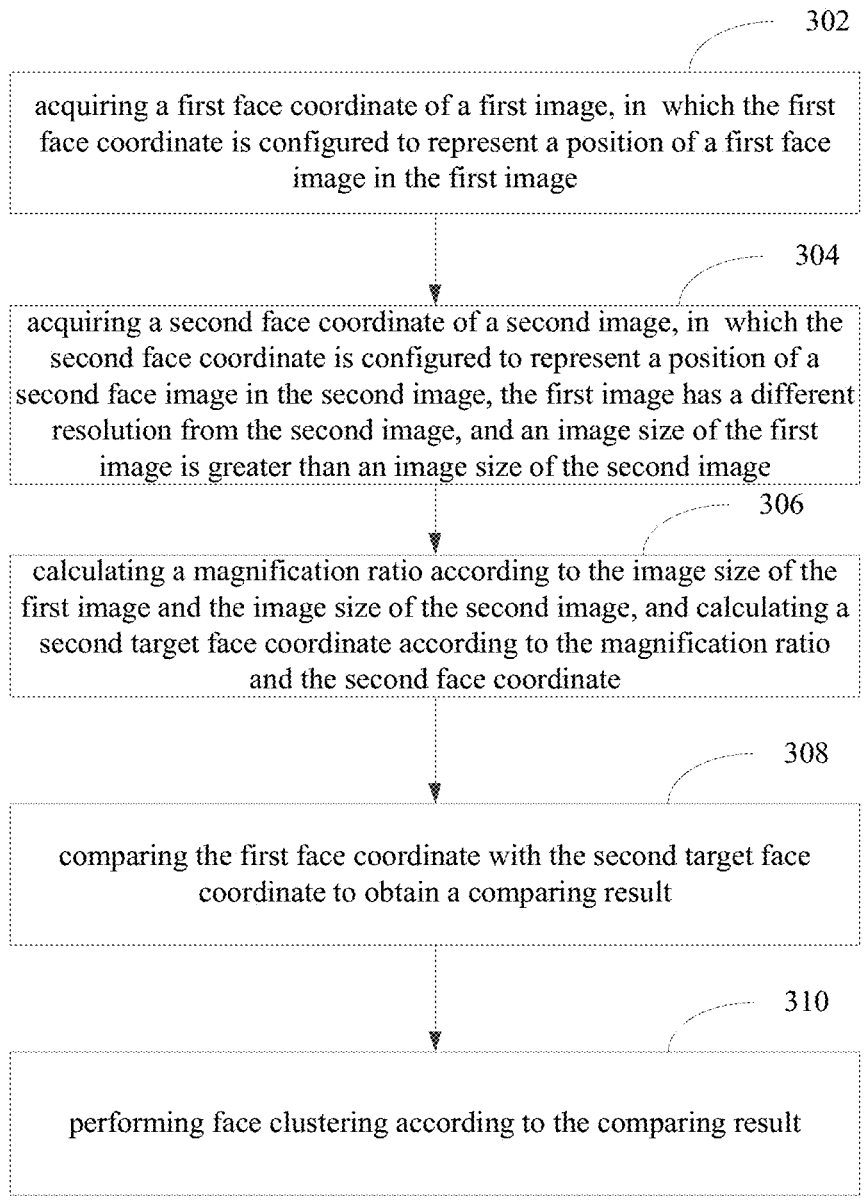
FIG. 3 is a flow chart of an image processing method in an embodiment.

FIG. 3 is a flow chart of an image processing method in an embodiment. As illustrated in FIG. 3, the image processing method includes blocks 302-310.

In block 302, a first coordinate of a first image is acquired. The first coordinate is configured to represent a position of a first face image in the first image, in which the first face image is included in the first image.

In embodiments provided by the present disclosure, a terminal may generate images continuously during operating. For example, the images may be captured by a camera of the terminal, or may be downloaded from webpages, or may be automatically cached during running applications. The terminal stores the generated images. In detail, several folders may be established in the memory, and the images generated during operating of the terminal may be saved with these folders. Images generated by different applications may be saved in different folders. For example, the images captured by the camera and the images downloaded from webpages are saved in different folders respectively. When there is a need to acquire an image, a memory address of the folder may be inputted to access the folder, and then the image in the folder is acquired.

The image stored in the terminal generally consists of several pixel points. Each pixel point may consist of a plurality of channels, and represent different color through different values of the plurality of channels. For example, the image captured may consist of RGB (red, green, blue) channels, or may consist of HSV (hue, saturation, value) channel, or may consist of CMY (cyan, magenta, yellow) channels. The pixel points in the image are arranged in a two-dimensional array. Different patterns are formed through regular arrangement of the pixel points. When processing the image, channel values of pixel points or arrangement and combination of the pixel points may be processed.

In block 304, a second face coordinate of a second image is acquired. The second face coordinate is configured to represent a position of a second face image in the second image, in which the second face image is included in the second image. The first image and the second image have different resolutions, and an image size of the first image is greater than an image size of the second image.

In an embodiment, the first image and the second image are two images having different resolutions, and the image size of the first image is greater than the image size of the second image. For example, the first image may be an original image, and the second image may be obtained by compressing the first image to reduce the resolution of the first image. Face recognition is performed on the first image and the second image respectively to obtain the corresponding first face image and second face image as well as the first face coordinate corresponding to the first face image and the second face coordinate corresponding to the second face image. The first face image refers to the face image included in the first image, and the second face image refers to the face image included in the second image. It may be understood, the first face image or the second face image may be same or different, which is not limited. Each first face image corresponds to one first face coordinate, and each second face image corresponds to one second face coordinate.

Figure 4:
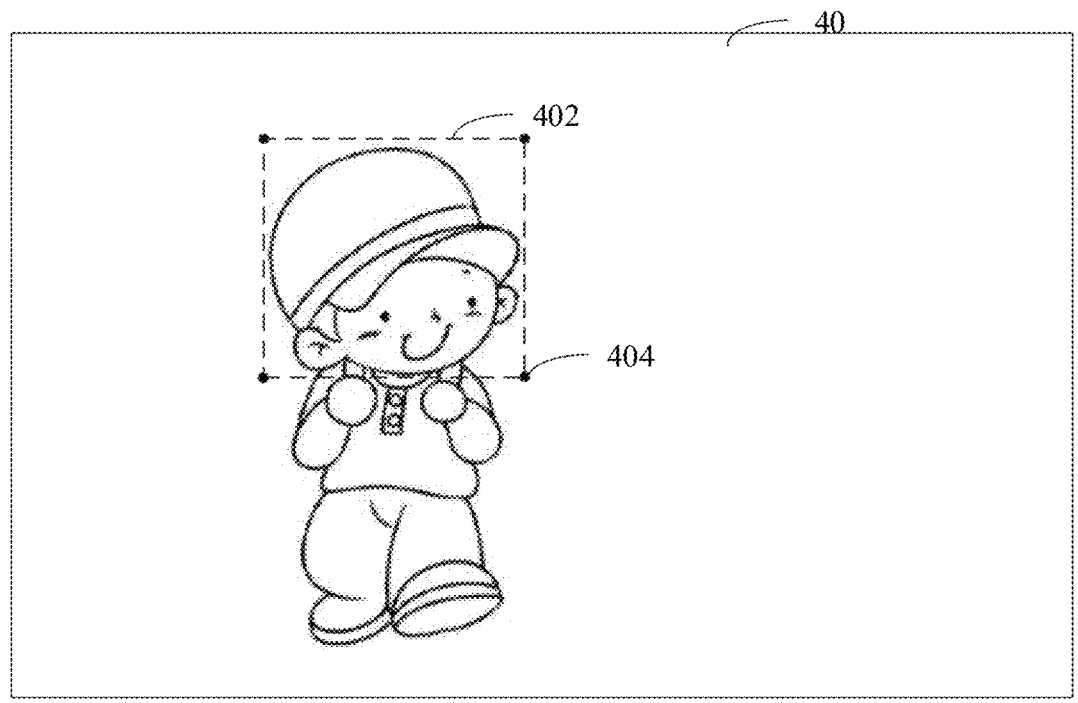
FIG. 4 is a schematic diagram of a face image and corresponding face coordinate in an embodiment.

The first image and the second image are images having different resolutions, such that when the face recognition is performed, the face results detected may be different. In general, when the face recognition is performed on the original image and the image obtained after compression, the face recognition result corresponding to the image with the higher resolution may have a higher precision, and the face recognition result corresponding to the image with the higher resolution may have a lower precision. For example, some faces in the compressed image are unclear and may not be recognized. For example, four faces are recognized from the first image, and only 2 faces are recognized from the second image. After face recognition, a minimum rectangular region where the face is located in the image is extracted as the face image, and then the face coordinate of the face image is represented by four vertex coordinates of the rectangular region. In detail, the first face coordinate is configured to represent the position of the first face image in first image, and the second face coordinate is configured to represent the position of the second face image in the second image. FIG. 4 is a schematic diagram of a face image and corresponding face coordinate in an embodiment. As illustrated in FIG. 4, the image 40 includes one face, and the minimum rectangular box where the face is located is the face image 402. The coordinate of the face image 402 may be represented by the coordinates of four vertices 404 of the rectangular box, including the coordinates of the top left vertex, the top right vertex, the bottom left vertex and the bottom right vertex. With the coordinates of these four vertices, the region and detailed position of the face image 402 in the image 40 may be determined.

In block 306, a magnification ratio is calculated according to an image size of the first image and an image size of the second image, and a second target face coordinate is calculated according to the magnification ratio and the second face coordinate.

In embodiments of the present disclosure, the first image and the second image are two images having different resolutions. After the face recognition is performed on the first image and the second image, the corresponding first face image and second face image as well as the first face coordinate corresponding to the first face image and the second face coordinate corresponding to the second face image are obtained. After the face recognition results are obtained, the face coordinates may be compared to determine whether the face recognition result of the first image is same as the face recognition result of the second image. The face coordinates may be compared only after the image size of the second image and the image size of the first image are adjusted to be same.

The image size refers to parameters representing a size of the image, including a width and a height of the image. Since the image consists of a two-dimensional matrix, the width and the height of the image may be represented by the number of pixel points in the horizontal direction and in the vertical direction respectively. For example, the image size may be represented as 640*320, which represents that the width of the image is 640 and the height is 320, i.e., the image has 640 pixel points arranged in each horizontal direction and 320 pixel points arranged in each vertical direction. By calculating the magnification ratio according to the image size of the first image and the image size of the second image, the second image may be magnified with the magnification ratio to have the same size as the first image. The pixel points included in the magnified second image correspond to the pixels points in the first image, which is equivalent to that they are in the same coordinate system. The first image is compared with the magnified second image to compare face recognition results of the two images. After the second image is magnified, the second face image included in the second image is magnified accordingly, and the face coordinate corresponding to the second face image also changes accordingly.

Figure 5:
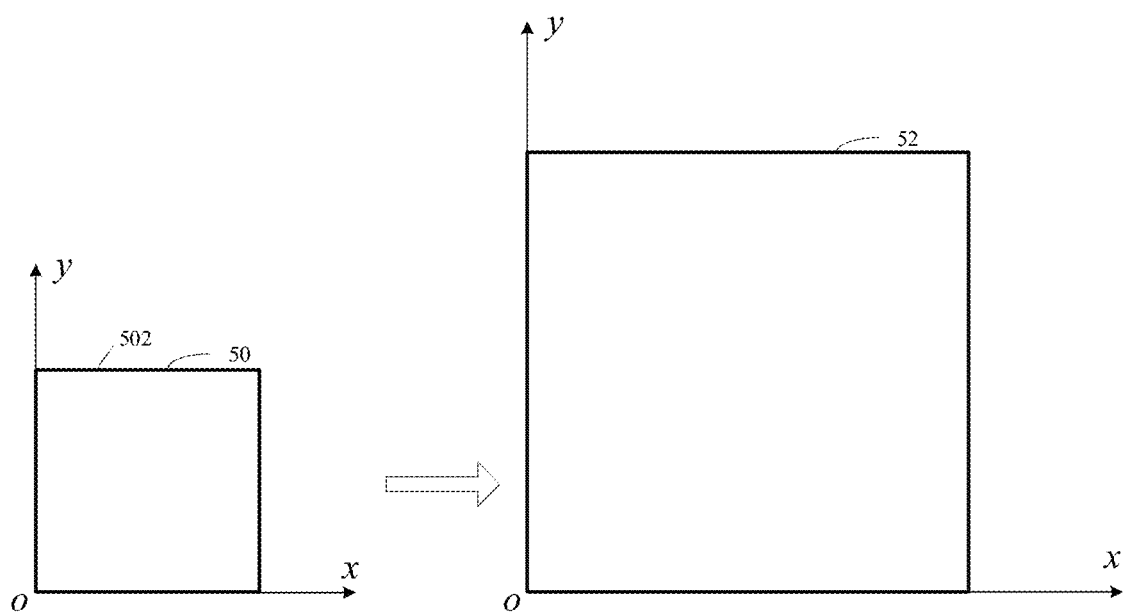
FIG. 5 is a schematic diagram of an image magnification process in an embodiment.

FIG. 5 is a schematic diagram of an image magnification process in an embodiment. As illustrated in FIG. 5, the image 50 is magnified, in which the image 50 includes 10*10 pixel points. The image 50 is magnified twice to obtain the image 52, and the obtained image 52 includes 20*20 pixel points. The coordinate of the pixel point 502 in the image 50 is (3, 9). After the image 50 is magnified, the pixel point in the image 52 corresponding to the pixel point 502 is the pixel point 522, and the coordinate of the pixel point becomes (6, 18).

In block 308, the first coordinate is compared with the second target face coordinate to obtain a comparing result.

After the second image is magnified, one pixel point in the first image is selected and aligned with one corresponding pixel point in the magnified second image, such that the first image and the magnified second image are in the same coordinate system. Then, respective face images in the first image and the magnified second image are compared, to obtain the comparing result. For example, the pixel point at the bottom left corner of the first image is defined as an original point, and the pixel point at the bottom left corner of the magnified second image is also defined as an original point, and thus the first image and the magnified second image may be aligned using the original points to be in the same coordinate system. The magnified second image is defined as the second target image, the face image in the magnified second image is the second target face image, and the corresponding face coordinate is the second target face coordinate. After the first image is aligned with the second target image, each first face image is compared with each second target face image. The position relationship of the first face image and the second target face image includes overlapping, inclusion, intersection and separation. It is possible to determine whether the first face image and the second target face image correspond to the same face according to the position relationship of the first face image and the second target face image. In general, when the first image is completely overlapped with the second target face image, the first face image and the second target face image correspond to the same face. When the first image and the second target face image have an intersection or inclusion relationship, it is possible to determine whether the first face image and the second target face image correspond to the same face according to an overlapping area. When the first face and the second target face image have a separation relationship, it is determined that the first face image and the second target face image correspond to different faces.

Since the first image and the second target image are in the same coordinate system, the electronic device may determine the position relationship of the first face image and the second target face image according to the first face coordinate and the second target face coordinate. In detail, when the first face coordinate and the second target face coordinate satisfy a first condition, it is determined that the first face image and the second target face image have a first position relationship; when the first face coordinate and the second target face coordinate satisfy a second condition, it is determined that the first face image and the second target face image have a second position relationship; when the first face coordinate and the second target face coordinate satisfy a third condition, it is determined that the first face image and the second target face image have a third position relationship; when the first face coordinate and the second target face coordinate satisfy a fourth condition, it is determined that the first face image and the second target face image have a fourth position relationship. The first position relationship, the second position relationship, the third position relationship and the fourth position relationship refer to overlapping, inclusion, intersection and separation respectively.

Figure 6:
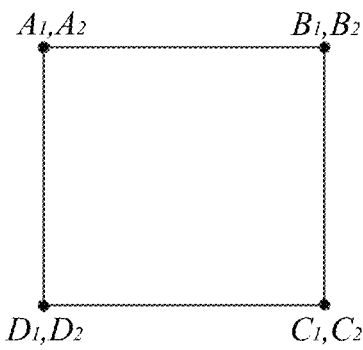
FIG. 6 is a schematic diagram illustrating position relationship of face images in an embodiment.
Figure 6:
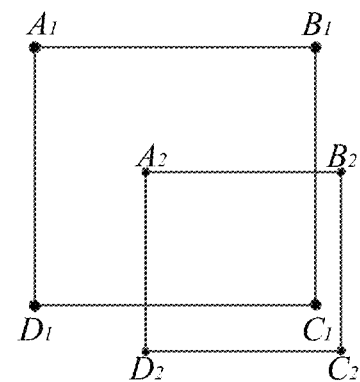
Figure 6:
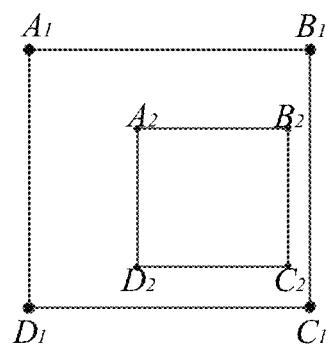
Figure 6:
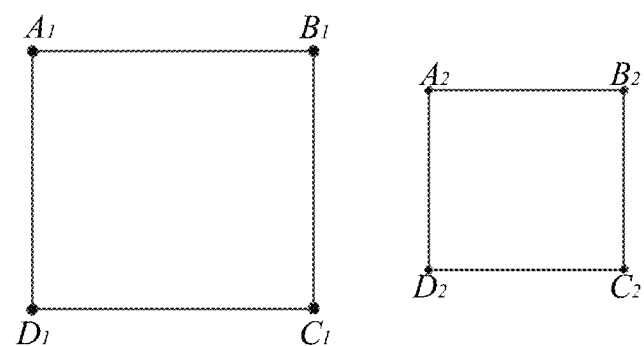

It may be understood, each of the first face coordinate and the second target face coordinate includes four vertices, and the position relationship of the first face image and the second target face image may be determined by comparing corresponding vertices of the first face coordinate and the second target face coordinate. FIG. 6 is a schematic diagram illustrating position relationship of face images in an embodiment. As illustrated in FIG. 6, four vertices defining the first face coordinate include $A_1(x_{m1}, y_{m1})$, $B_1(x_{n1}, y_{m1})$, $C_1(x_{n1}, y_{n1})$ and $D_1(x_{m1}, y_{n1})$, four vertices defining the second face coordinate include $A_2(x_{m2}, y_{m2})$, $B_2(x_{n2}, y_{m2})$, $C_2(x_{n2}, y_{n2})$ and $D_2(x_{m2}, y_{n2})$, in which $x_{m1} < x_{n1}$, $y_{m1} > y_{n1}$, $x_{m2} < x_{n2}$, $y_{m2} > y_{n2}$. The position relationship of the first face image and the second target face image may be determined by comparing the vertices of the first face coordinate with the vertices of the second target face coordinate correspondingly. For example, when the first face image and the second target face image have the overlapping relationship, the first face coordinate and the second target face coordinate satisfy the first condition: $x_{m1} = x_{m2}$, $y_{m1} = y_{m2}$, $x_{n1} = x_{n2}$, $y_{n1} = y_{n2}$. When the first face image and the second target face image have the inclusion relationship, the first face coordinate and the second target face coordinate satisfy the second condition: $x_{m1} < x_{m2}$ and $y_{m1} > y_{m2}$ and $x_{n1} > x_{n2}$ and $y_{n1} < y_{n2}$. When the first face image and the second target face image have the intersection relationship, the first face coordinate and the second target face coordinate satisfy the third condition: $x_{m1} > x_{n2}$ or $x_{n1} < x_{m2}$ or $y_{m1} < y_{n2}$ or $y_{n1} > y_{m2}$. When the first face coordinate and the second target face coordinate does not satisfy any of the foregoing three conditions, the first face image and the second target face image have the separation relationship.

In block 310, face clustering is performed according to the comparing result.

In an embodiment, the face clustering refers to a process in which faces are classified. In block 308, the position relationship of the first face image and the second target face image may be determined, and thus the relationship of the first face image and the second face image may be determined according to the position relationship of the first face image and the second target face image, i.e., whether the first face image and the second face image correspond to the same face may be determined. When the first face image and the second face image correspond to the same face, only one of the first face image and the second face image is reserved when generating the face image set. When the first face image and the second face image correspond to different faces, both the two face images are reserved when generating the face image set.

It may be understood, when the first image corresponds to a plurality of first face images and the second image corresponds to a plurality of second face images, each of the plurality of first face images may be compared with each of the plurality of second face image, and the face image set may be generated according to the comparing result. When there is the second face image corresponding to the second face image, one of these two face images is selected for saving. When there is no second face image corresponding to the first face image, the first face image may be saved. When there is no first face image corresponding to the second face image, the second face image may be saved.

With the image processing method provided by foregoing embodiments, the first image and the second image having different resolutions are acquired, the magnification ratio is calculated according to the image size of the first image and the image size of the second image, the second face coordinate is processed according to the magnification ratio to obtain the second target face coordinate, and the first face coordinate is compared with the second target face coordinate to obtain the relationship of the first face image and the second face image, and face clustering is performed according to the comparing result. In this way, recognition results of two images with different resolutions may be compared by placing the two images in the same coordinate system and determining the relationship of face images according to the face coordinates, such that the comparing result is more accurate, which improves accuracy of image processing.

Figure 7:
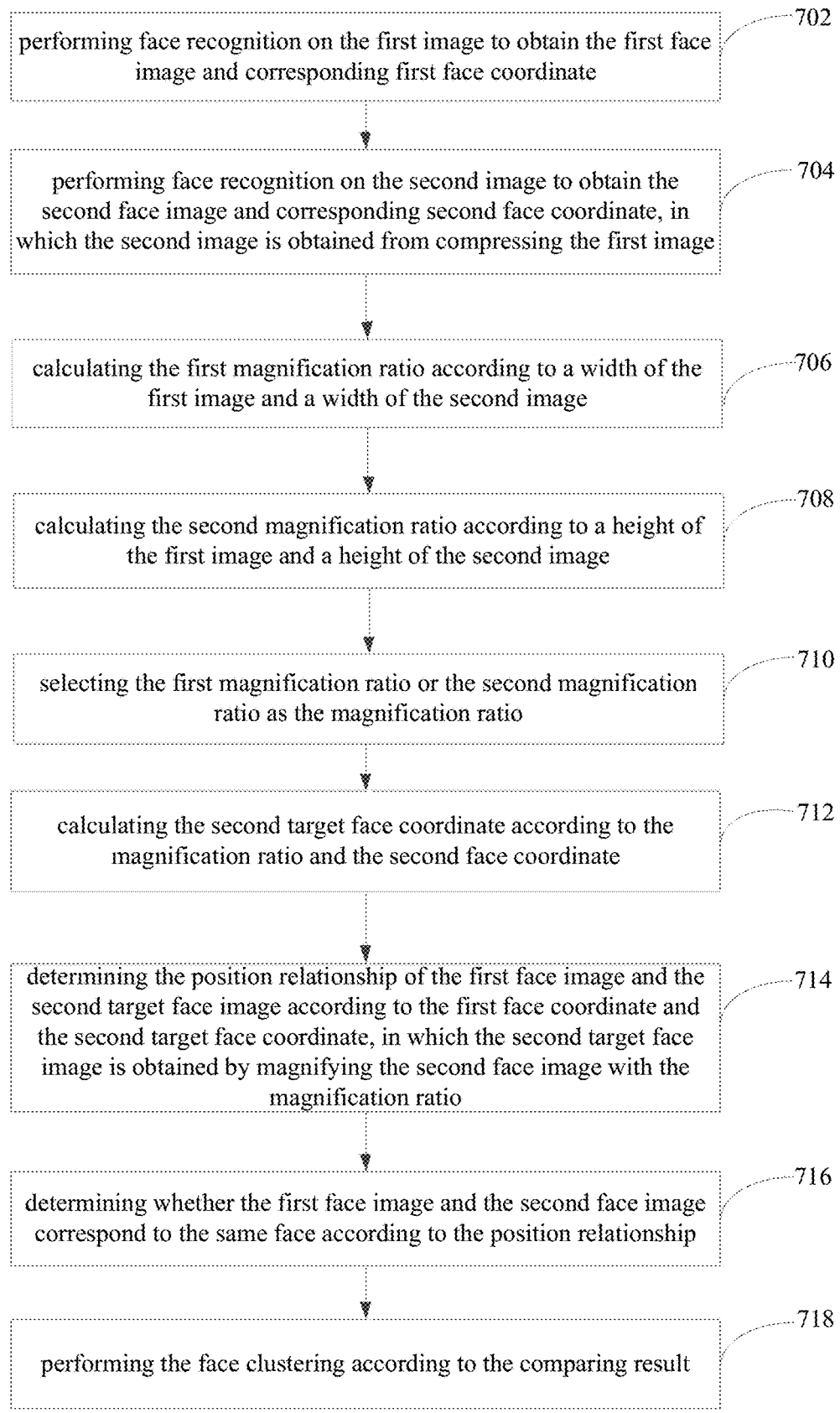
FIG. 7 is a flow chart of an image processing method in another embodiment.
Figure 8:
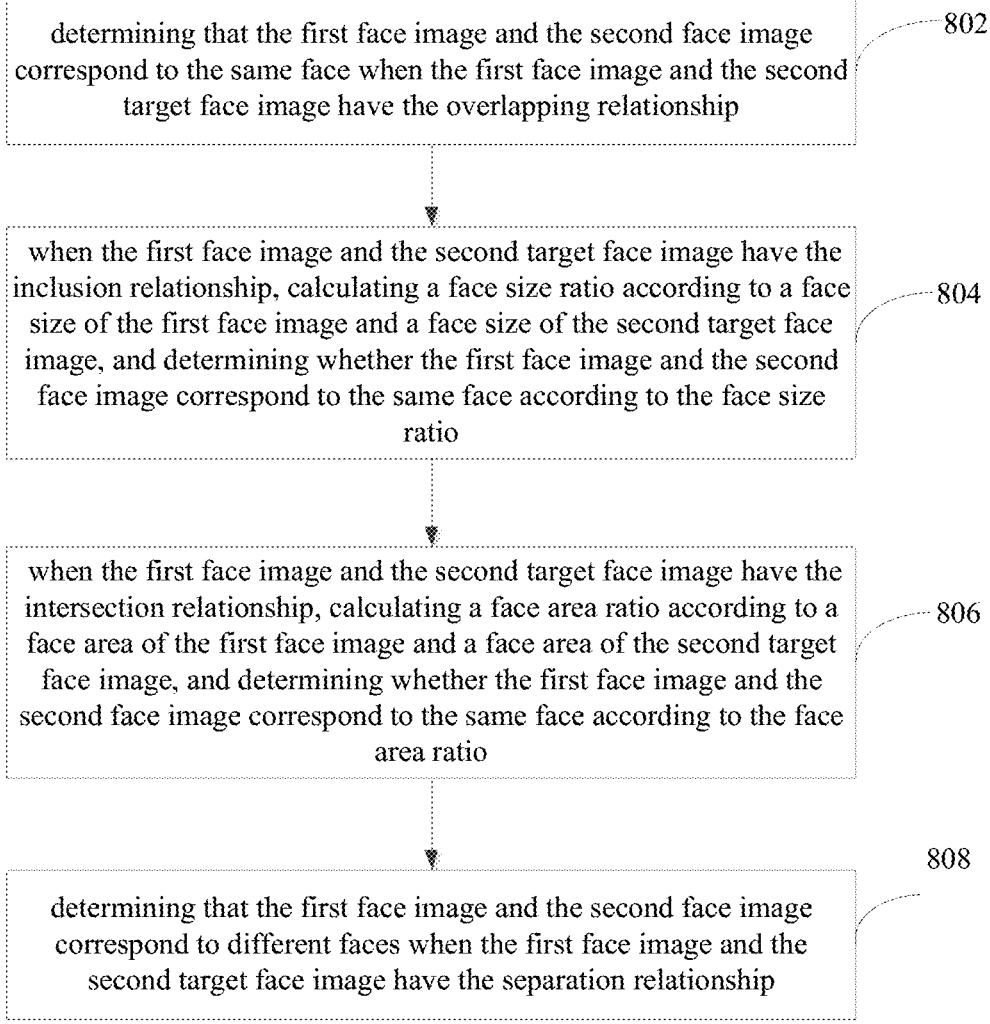
FIG. 8 is a flow chart of an image processing method in yet another embodiment.

FIG. 7 is a flow chart of an image processing method in another embodiment. As illustrated in FIG. 7, the image processing method includes blocks 702-726.

In block 702, face recognition is performed on a first image to obtain a first face image and corresponding first face coordinate.

In an embodiment, the terminal may generate images continuously during operating. However, since the terminal has a limited storage capability, the terminal needs to clear data stored therein in time to free the memory. The terminal may send the stored first image to server for backup, and after backup of the server, the terminal may delete the first image or compress the first image to reduce a memory usage of the terminal. The first image stored in the server is the original image, and the terminal may compress the first image to generate the second image. The first image and the second image are images having different resolutions, and the image size of the first image is greater than the image size of the second image. The server may perform face recognition on the first image to obtain the corresponding first face image. The face recognition refers to recognizing a face in the image, specifically, based on a face recognition model. The face recognition model may first extract face images in the images and corresponding face features, and then classify the face images according to the face features. Since the server has a powerful processing capability, the server may perform face recognition on the first image with a face recognition model having a higher precision. In detail, the server performs face recognition on the first image with the first face recognition model to obtain the first image and the corresponding first face coordinate. The first image and the corresponding first face coordinate have the higher precision.

After the face recognition is performed on the first image, several corresponding face images may be obtained. Then, correspondence relationships among the first image identification, the first face identifications, the first face coordinates and the first classification identification may be established. The image identification refers to a unique identification of the image. The face identification refers to a unique identification of the face image, the face coordinate is configured to represent the position of the face image in the image, and the classification identification is configured to indicate classification information of the face image. The image identification may have a one-to-one correspondence with the face identification or may have a one-to-many correspondence with the face identifications. The face identification, the face coordinate and the classification identification may have a one-to-one correspondence with each other. For example, the image identification may be "image.jpg", the image includes three faces, face identifications corresponding to the three face images are "image_face01", "image_face02" and "image_face03" respectively, and the classification identification of the three face images are "group_01", "group_02" and "group_03" respectively, which indicates that the three face images are classified to different groups.

In block 704, face recognition is performed on a second image to obtain second face image and corresponding second face coordinate, in which the second image is obtained by compressing the first image.

In embodiments provided by the present disclosure, the face recognition is performed both in the terminal and in the server. Since the terminal has a limited computing capability, the image may be compressed first before processing the image, so as to reduce computation amount of the processing. The compressing may reduce the size of the image, such that the storage space occupied by the image is reduced. Accordingly, when the compressed image is processed, the computation amount of the processing may be reduced. In detail, the compressing may be reducing the image with a certain scale, or reducing the image to a certain size. For example, for the images whose sizes are 200*300 and 300*600 respectively, when the images are reduced with a same scale of 1:0.5, the image sizes of the compressed images are 100*150 and 150*300 respectively. When the images are reduced to the fixed size 100*200, both the sizes of the compressed images are 100*200. The terminal may compress the first image to obtain the second image, and then perform face recognition on the second image.

The terminal may perform the face recognition on the second image with a second face recognition model, to obtain the second face image and the corresponding second face coordinate. The second face recognition model stored in the terminal is a micro recognition model, and the first face recognition model stored in the server is a full face recognition model. The algorithm of the first face recognition model is more complicated than the algorithm of the second face recognition model, and thus the recognition result obtained from the first face recognition model is more precise, i.e., the recognition precision of the second face recognition model is lower than the recognition precision of the first face recognition model. After performing the face recognition on the second image, the terminal may obtain several corresponding face images, and then may establish the correspondence relationship among the second image identification, the second face identifications, the second face coordinates and the second classification identifications. It may be understood, the terminal and the server perform face recognition on the images having different resolutions, and the face images obtained from the face recognition may be same or may be different.

The server may perform face recognition on the first image periodically, and send the first face recognition result to the terminal when detecting that the terminal is connected to the network. The network may include a Wifi (Wireless Fidelity) network, a 2G data network, a 3G data network, a 4G data network, and the like. When the terminal detects the connection network, the terminal may automatically send the face image acquiring request to the server, in which the face image acquiring request includes the terminal identification. After receiving the face image acquiring request, the server may return the first face recognition result corresponding to the terminal identification to the terminal. Taking the Android system as an example, the NetworkInfo class includes detailed description of two network connections (Wifi and data network), and the connection state of the current network may be acquired by means of getState( ) method. Since the first face recognition result issued by the server may occupy a bigger space, the data traffic consumed during transmission is relatively large. Therefore, before receiving the first face recognition result, the terminal may determine a network type of the connected network. When the connected network is of a preset network type, the terminal receives the first face recognition result sent by the server. For example, when the terminal is connected with Wifi, the terminal receives the first face recognition result sent by the server. It may be understood that, face recognition of the first image and face recognition of the second image may be performed in different terminals, to obtain the corresponding first face coordinate and second face coordinate. For example, the face recognition of the first image is performed in a tablet computer to obtain the first face coordinate, and the face recognition of the second image is performed in a mobile phone to obtain the second face coordinate.

In block 706, a ratio of a width of the first image to a width of the second image is calculated to obtain a first magnification ratio.

In block 708, a ratio of a height of the first image to a height of the second image is calculated to obtain a second magnification ratio.

When the terminal receives the first face recognition result sent by the server, the terminal may compare the first face recognition result with the second face recognition result obtained by the terminal First, the second image needs to be restored to the same size as the first image. Then, the second target face image in the restored second image is compared with the first face image, to determine whether the first image overlaps with the second target face image, and to determine whether these two face images correspond to the same face according to the overlapping degree. In detail, the magnification ratio for restoring and magnifying the second image is needed to be calculated first. For this, the first magnification ratio is calculated according to the ratio of the width of the first image to the width of the second image, the second magnification is calculated according to the ratio of the height of the first image to the height of the second image, and then the magnification ratio is obtained according to the first magnification ratio and the second magnification ratio.

In block 710, the first magnification ratio or the second magnification ratio is selected as a magnification ratio.

In detail, in order to keep an original width-to-height ratio of the magnified second image, the ratio for magnifying the width and the ratio for magnifying the height need to keep consistent with each other during the magnification process. In order to reduce an error of the comparing, the bigger one of the first magnification ratio and the second magnification ratio is selected as the final magnification ratio. When the first magnification ratio is greater than or equal to the second magnification ratio, the first magnification ratio is selected as the magnification ratio. When the first magnification ratio is less than the second magnification ratio, the second magnification ratio is selected as the magnification ratio. For example, assuming that the width and height of the first image are A_Width and A_Height respectively and the width and height of the second image are B_Width and B_Height respectively, the first magnification ratio is calculated as scale_1=A_Width/B_Width, the second magnification ratio is calculated as scale_2=A_Width/B_Width, and the magnification ratio obtained according to the first magnification ratio and the second magnification ratio is scale=Math.max (scale_1, scale_2).

In block 712, a second target face coordinate is calculated according to the magnification ratio and the second face coordinate.

In detail, the second face coordinate is multiplied by the magnification ratio to obtain the second target face coordinate. The magnified second face coordinate is the second target face coordinate. It may be understood, the second face coordinate includes four vertex coordinates, which are multiplied by the magnification ratio respectively, to obtain four vertex coordinates included in the second target face coordinate. In detail, the horizontal coordinate of the second face coordinate is multiplied by the magnification ratio to obtain the horizontal coordinate of the second target face coordinate, and the vertical coordinate of the second face coordinate is multiplied by the magnification ratio to obtain the vertical coordinate of the second target face coordinate. For example, assuming that the second face coordinate includes four vertices A $(x_1,y_1)$, B$(x_2,y_2)$, C$(x_2,y_2)$ and D$(x_1,y_2)$, and the magnification ratio is 2, then the four vertices included in the second target face coordinate are A' $(2x_1,2y_1)$, B' $(2x_2,2y_1)$, C' $(2x_2,2y_2)$ and D' $(2x_1,2y_2)$.

In block 714, position relationship between the first face image and the second target face image is determined according to the first face coordinate and the second target face coordinate, in which the second target face image is the face image obtained by magnifying the second face image with the magnification ratio.

In an embodiment, the second face image is magnified based on the magnification ratio to obtain the second target face image, and the position relationship between the first face image and the second target face image is determined according to the first face coordinate and the second target face coordinate. In detail, when the first face coordinate and the second target face coordinate satisfy a first condition, it is determined that the first face image and the second target face image have a first position relationship; when the first face coordinate and the second target face coordinate satisfy a second condition, it is determined that the first face image and the second target face image have a second position relationship; when the first face coordinate and the second target face coordinate satisfy a third condition, it is determined that the first face image and the second target face image have a third position relationship; when the first face coordinate and the second target face coordinate satisfy a fourth condition, it is determined that the first face image and the second target face image have a fourth position relationship. The first position relationship, the second position relationship, the third position relationship and the fourth position relationship may refer to overlapping, inclusion, intersection and separation respectively.

In block 716, whether the first face image and the second face image correspond to the same face is determined according to the position relationship.

When the first face image overlaps completely with the second target face image, it may be determined that the first face image and the second face image correspond to the same face. When the first face image and the second target face image have inclusion or intersection relationship, whether the first face image and the second face image correspond to the same face may be determined according to the overlapping degree of the first face image and the second target face image. When the first face image and the second target face image are completely separate from each other, it may be determined that the first face image and the second face image correspond to different faces. The comparing may be performed as illustrated in blocks 802-808.

In block 802, when the first face image and the second target face image have the overlapping relationship, the first face image and the second face image correspond to the same face.

The overlapping relationship refers to that the two images overlap with each other completely. When the first face image and the second target face image have the overlapping relationship, it indicates that the overlapping degree of the first face image and the second target face image reaches 100%, and it may be determined that the first face image and the second face image correspond to the same face.

In block 804, when the first face image and the second target face image have the inclusion relationship, a face size ratio is calculated according to a face size of the first face image and a face size of the second target face image, and whether the first face image and the second face image correspond to the same face is determined according to the face size ratio.

In detail, the inclusion relationship refers to that one image may completely contain another image. For example, the first face image may contain the second target face image, or the second target face image may contain the first face image. When the first face image and the second target face image have the inclusion relationship, the overlapping degree of the first face image and the second target face image may be determined directly according to the face size ratio of the first face image and the second target face image. The face size refers to a size of the face image, including a face width and a face height of the face image. A first face size ratio is calculated according to the face width of the first face image and the face width of the second target face image. The face width of the first face image is defined as the first face width, and the face width of the second target face image is defined as the second face width. The smaller one of the first face width and the second face width is divided by the bigger one of the first face width and the second face width, to obtain the first face size ratio. When the first face width is less than the second face width, the first face width is divided by the second face width to obtain the first face size ratio. When the first face width is greater than the second face width, the second face width is divided by the first face width to obtain the first face size ratio.

A second face size ratio is obtained according to the face height of the first face image and the face height of the second target face image. Similarly, the face height of the first face image is defined as a first face height, the face height of the second target face image is defined as a second face height, and the second face size ratio is obtained from dividing the smaller one of the first face height and the second face height by the bigger one of the first face height and the second face height. When the first face height is less than the second face height, the first face height is divided by the second face height to obtain the second face size ratio. When the first face height is greater than the second face height, the second face height is divided by the first face height to obtain the second face size ratio.

The face size ratio is obtained according to the first face size ratio and the second face size ratio. The first face size ratio or the second face size ratio may be selected as the face size ratio. The smaller one of the first face size ratio and the second face size ratio may be selected as the final face size ratio. In detail, when the first face size ratio is greater than or equal to the second face size ratio, the second face size ratio is selected as the face size ratio; when the first face size ratio is less than the second face size ratio, the first face size ratio is selected as the face size ratio. When the face size ratio is greater than a preset size ratio threshold, it is determined that the first face image and the second face image correspond to the same face. For example, assuming that the first face width is A_Width, the first face height is A_Height, the second face width is B_Width, and the second face height is B_Height, then the first face size ratio is ratio_1=A_Width/B_Width, the second face size ratio is ratio_2=A_Height/B_Height, and the finally obtained face size ratio is ratio=Math.min(ratio_1, ratio_2). Assuming that the face size ratio threshold is 0.5, then it is determined that the first face image and the second face image correspond to the same face when the face size ratio is greater than 0.5.

In block 806, when the first face image and the second target face image have the intersection relationship, a face area ratio is calculated according to a face area of the first face image and a face area of the second target face image, and whether the first face image and the second face image correspond to the same face is determined according to the face area ratio.

When the first face image and the second target face image have the intersection relationship, it indicates that the first face image partially overlaps with the second target face image, and relationship between the first face image and the second face image may be determined according to an area of the overlapping portion between the first face image and the second target face image. In detail, an area of an intersection of the first face image and the second target face image is acquired as a first face area, an area of a union of the first face image and the second target face image is acquired as a second face area, and the face area ratio is calculated according to the first face area and the second face area. When the face area ratio is greater than an area ratio threshold, it is determined that the first face image and the second face image correspond to the same face. For example, assuming that the region where the first face image is located is A_Rect, and the region where the second target face image is located is B_Rect, then the first face area is represented as A_Rect∩B_Rect, and the second face area is represented as A_Rect∪B_Rect. The ratio of the first face area to the second face area is the face area ratio, and thus the obtained face area ratio is ratio=(A_Rect∩B_Rect)/(A_Rect∪B_Rect). Assuming that the face area ratio threshold is 0.7, then it is determined that the first face image and the second face image correspond to the same face when the face area ratio is greater than 0.7. It may be understood, the face size ratio threshold and the face area ratio threshold may be set based on demands, which is not limited herein. The face area ration threshold is typically set as a value greater than the face size ratio threshold.

In block 808, when the first face image and the second target face image have the separation relationship, the first face image and the second face image correspond to different faces.

When the first face image and the second target face image have the separation relationship, it indicates that the first face image is completely separated from the second target face image, and it may be determined that the first face image and the second face image correspond to two completely different faces.

In block 718, face clustering is performed according to the comparing result.

In detail, when the first face image and the second face image correspond to the same face, the face image set is generated based on the first face image. The recognized face image further includes information such as the face coordinate and the classification identification. The server performs face recognition on the first image with the first face recognition model, and the obtained first face image and corresponding information such as the first face coordinate and the first classification identification are more accurate. Therefore, when the first face image and the second face image correspond to the same face, only the first face image with the higher precision needs to be saved, and the face image set is generated based on the first face image.

When the first face image and the second target face image correspond to different faces, the face image set is generated based on the first face image and the second face image. When the first face image and the second target face image correspond to different faces, both the first face image and the second face image need to be saved, i.e., the face image set is generated based on the first face image and the second face image. It may be understood, the first image may include a plurality of first face images, and the second image may include a plurality of second face images. After each of the plurality of first face images is compared with each of the plurality of second face images, relationship between each of the plurality of first face images and each of the plurality of second face images can be determined and the face set can be generated based on the comparing result. When there is the second face image corresponding to the first face image, one face image is selected and reserved. When there is no second face image corresponding to the first face image, the first face image may be reserved. When there is no first face image corresponding to the second face image, the second face image may be reserved. For example, the first image includes two first face images, Face1_01 and Face1_02, and the second image includes two second face images, Face2_01 and Face2_02. When Face1_01 is neither corresponding to Face2_01 nor corresponding to Face2_02, and Face1_02 and Face2_02 correspond to the same face, the finally generated face image set includes three face images Face1_01, Face1_02 and Face2_01.

Figure 9:
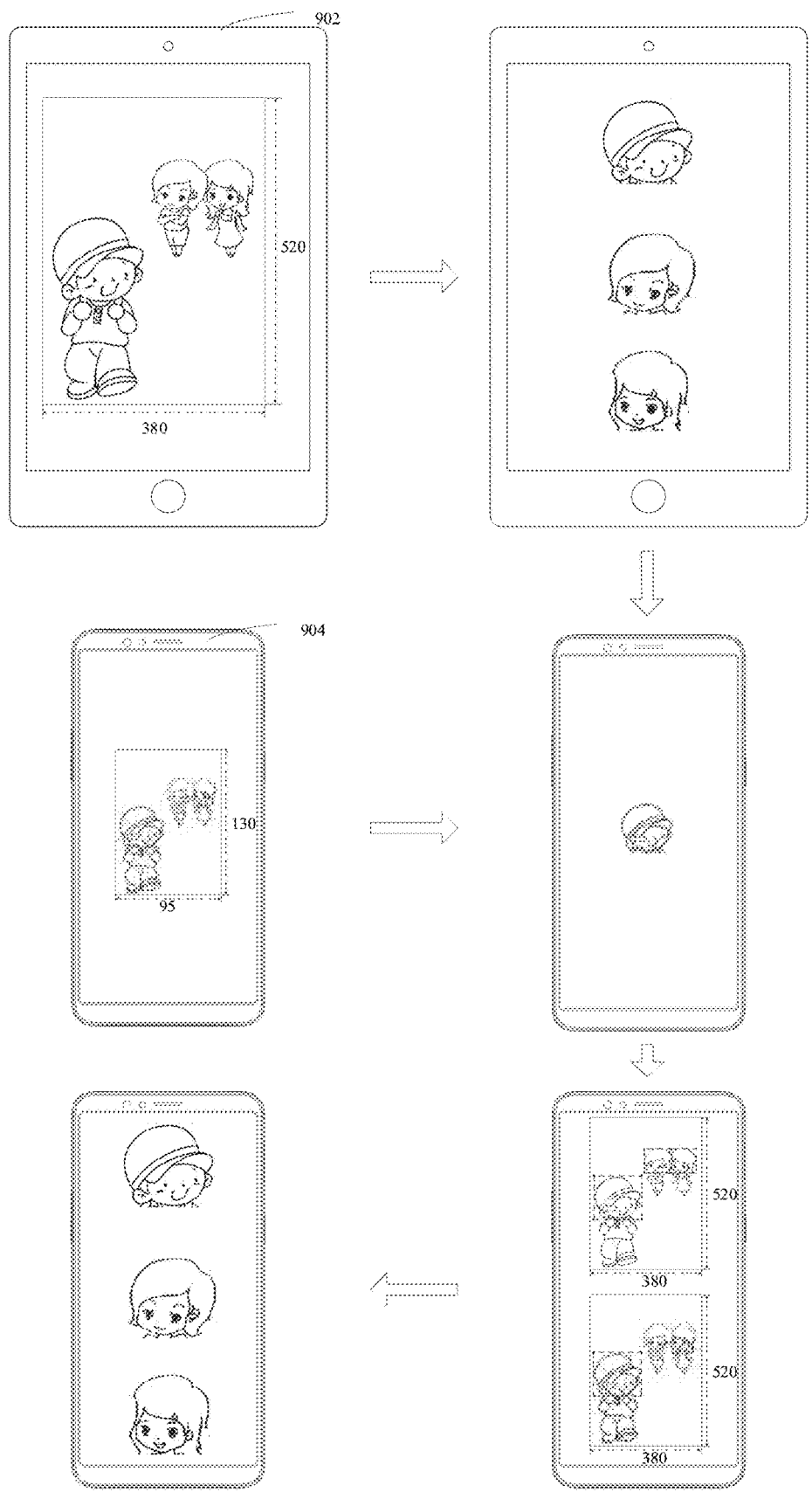
FIG. 9 is a schematic diagram illustrating an image processing flow in an embodiment.

FIG. 9 is a schematic diagram illustrating an image processing flow in an embodiment. As illustrated in FIG. 9, in the image processing flow, the first image is stored in the tablet computer 902, and the second image is stored in the mobile phone 904. The size of the first image is 380*520, and the size of the second image is 95*130. The tablet computer 902 performs face recognition on the first image to obtain three first face images and corresponding first face coordinates. The mobile phone 904 performs face recognition on the second image to obtain one second face image and corresponding second face coordinate. The face recognition result shows that, since the resolution of the second image in the mobile phone 904 is lower than that of the first image in the tablet computer 902, the result obtained by the mobile phone 904 from recognizing the second image with the lower resolution is generally not accurate, while the result obtained by the tablet computer 902 from recognizing the first image with the higher resolution is more precise. After obtaining the recognition result, the tablet computer 902 sends the first face coordinates and the first face images to the mobile phone 904. The mobile phone 904 magnifies the second image to 380*520, compares the first face coordinate with the second target face coordinate obtained after magnification, and perform face clustering according to the comparing result to obtain the face image set.

Figure 10:
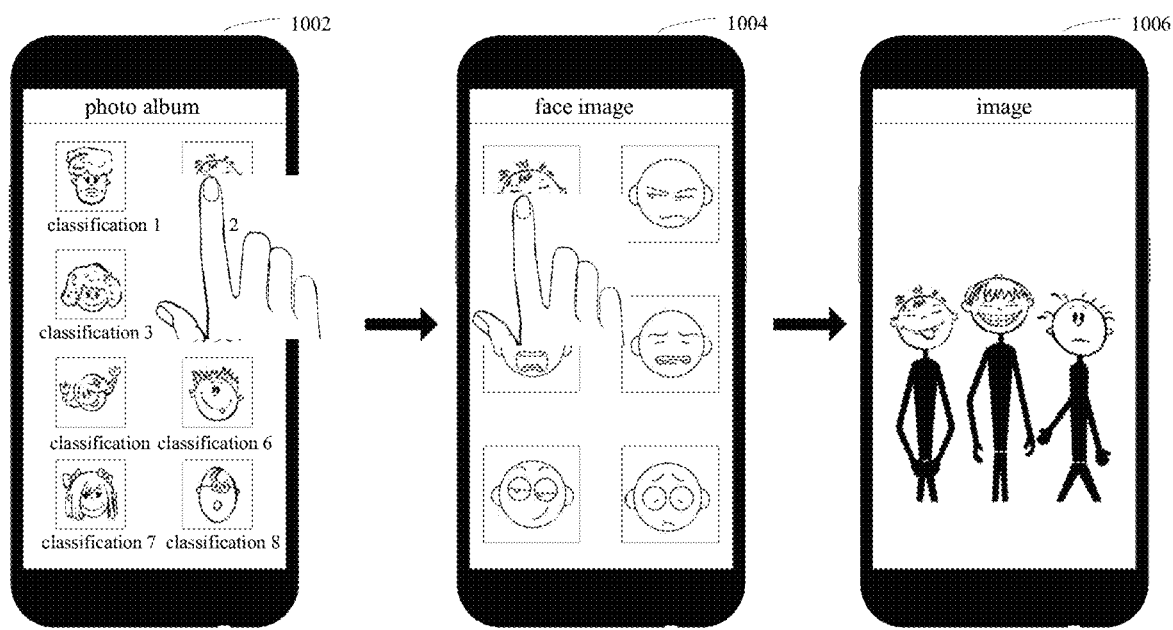
FIG. 10 is a schematic diagram illustrating an image classification displayed on a terminal in an embodiment.

In an embodiment, the first image and/or the second image may be classified according to the generated face image set. The generated face image set may include one or more face images, and each face image has information such as the image identification, the face identification, the face coordinate and the classification identification. Images corresponding to the same face image may be classified to the same class. Since the image may include more than one faces, the image may be classified to more than one class. FIG. 10 is a schematic diagram illustrating an image classification displayed on a terminal in an embodiment. As illustrated in FIG. 10, the mobile terminal classifies the images according to the face image set, and displays the classification result on the interface of the mobile terminal. The classification display interface 1002 displays eight classification results, including "classification 1", "classification 2", "classification 3", "classification 4", "classification 5", "classification 6", "classification 7" and "classification 8". Each classification includes several face images having common feature. When one classification is clicked, the face image display interface 1004 display face images in the classification. When one face image is clicked, the image display interface 1006 displays images corresponding to the face image.

It may be understood, the server may back up the first image uploaded by the terminal. The first image stored in the server may establish a correspondence relationship with the terminal. In this way, the terminal may acquire the first image from the server even if the terminal deletes the first image. The server may generate a first image set according to the received first images, and generate a webpage link according to the first image set, and return the webpage link to the terminal. The terminal may view the stored first image set by accessing the webpage link, and may download the first image in the first image set. The webpage link corresponds to a webpage document. When the webpage link is clicked, the terminal acquires and reads the webpage document, in which the webpage document includes memory addresses of these first images and image identifications. After acquiring the webpage document, the terminal analyzes the webpage document, and display content in the webpage document, such that the user views the first images through the displayed content.

Figure 11:
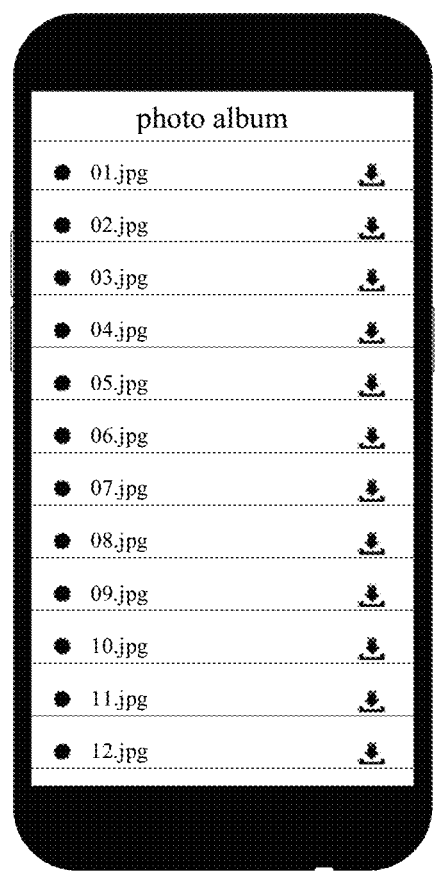
FIG. 11 is a schematic diagram illustrating an image download interface on a terminal in an embodiment.

The terminal may send the image download request to the server, and then receive the downloaded image returned by the server according to the image download request. The image download request is initiated by the terminal for acquiring the first image in the first image set, the image download request includes the identification corresponding to any one or more first images in the first image set, and the downloaded image is the first image returned by the server according to the image download request. It may be understood, when there is no second image corresponding to the downloaded image in the terminal, the downloaded image may be classified directly according to the first face image corresponding to the downloaded image. When there is the second image corresponding to the downloaded image in the terminal, the face image set may be generated based on the comparing result of the downloaded image and the second image, and the downloaded image is classified according to the generated face image set. In detail, the terminal and the server may first establish communication connection, and after the communication connection is established successfully, the server returns a connection success message to the terminal. For example, the terminal and the server may establish the communication connection via a pair of ports (socket), and transmit images through the connected ports after the connection is established. After the connection is established successfully, the terminal sends the image download request to the server. FIG. 11 is a schematic diagram illustrating an image download interface on a terminal in an embodiment. As illustrated in FIG. 11, the display interface displays the first image stored in the server. The mobile terminal may view the first image uploaded to the server via this interface and download the first image via this interface.

With the image processing method provided by foregoing embodiments, the first image and the second image having different resolutions are acquired, the magnification ratio is calculated according to the image sizes of the first image and the second image, the second face coordinate is processed according to the magnification ratio to obtain the second target face coordinate, and the first face coordinate is compared with the second target face coordinate to obtain the relationship of the first face image and the second face image, and finally the face clustering is performed according to the comparing result. In this way, recognition results of two images with different resolutions may be compared by placing the two images in the same coordinate system and determining the relationship of face images according to the face coordinates, the comparing result is more accurate, and the accuracy of image processing is improved.

Figure 12:
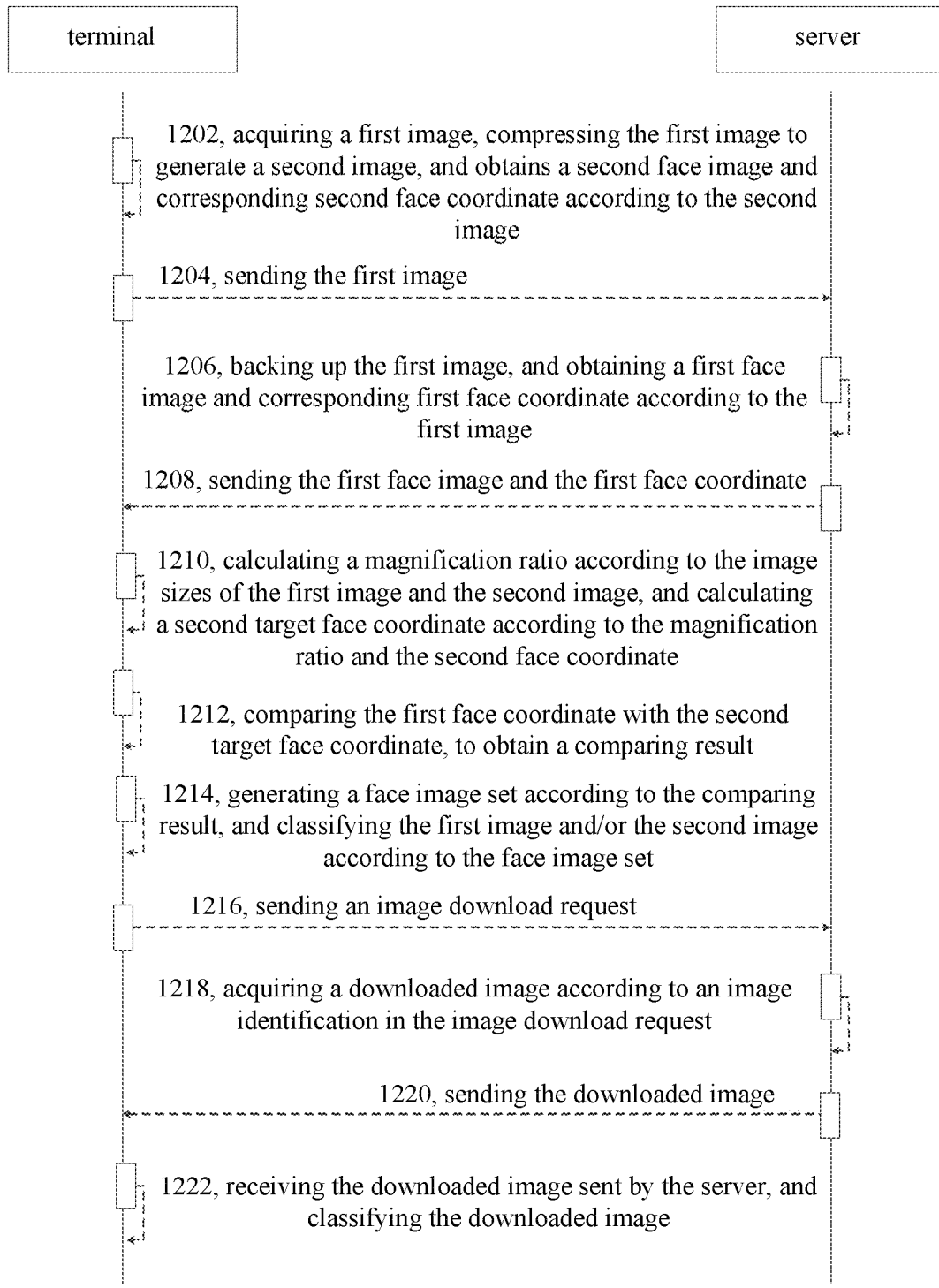
FIG. 12 is a schematic diagram illustrating an image processing method in an embodiment.

FIG. 12 is a schematic diagram illustrating an image processing method in an embodiment. As illustrated in FIG. 12, the image processing method includes 1202-1222.

At 1202, the terminal obtains the first image, compresses the first image to obtain the second image, and performs face recognition on the second image to obtain the second face image and corresponding second face coordinate.

At 1204, the terminal sends the first image to the server.

At 1206, the server receives the first image sent by the terminal, backs up the first image, and performs face recognition on the first image to obtain the first face image and corresponding first face coordinate.

At 1208, the server sends the first face image and the first face coordinate to the terminal.

At 1210, the terminal receives the first face image and the first face coordinate returned by the server, calculates the magnification ratio according to the image size of the first image and the image size of the second image, and calculates the second target face coordinate according to the magnification ratio and the second face coordinate.

At 1212, the terminal compares the first face coordinate with the second target face coordinate to obtain the comparing result.

At 1214, the terminal generates the face image set according to the comparing result, and classifies the first image and/or the second image according to the face image set.

At 1216, the terminal sends the image download request to the server, in which the image download request includes the image identification corresponding to one or more first image.

At 1218, the server receives the image download request sent by the terminal, and acquires the downloaded image according to the image identification in the image download request.

At 1220, the server returns the downloaded image to the terminal.

At 1222, the terminal receives the downloaded image sent by the server, and classifies the downloaded image.

With the image processing method provided above, recognition results of two images with different resolutions may be compared by placing the two images in the same coordinate system and determining the relationship of face images according to the face coordinates, to obtain the comparing result. The generated face set includes recognition results of images with different resolutions, which improves the accuracy of image processing. Moreover, the terminal may acquire the downloaded image from the server, and classify the downloaded image, which avoids that the terminal mistakenly deletes the image, and further improves the accuracy of the image processing.

Figure 13:
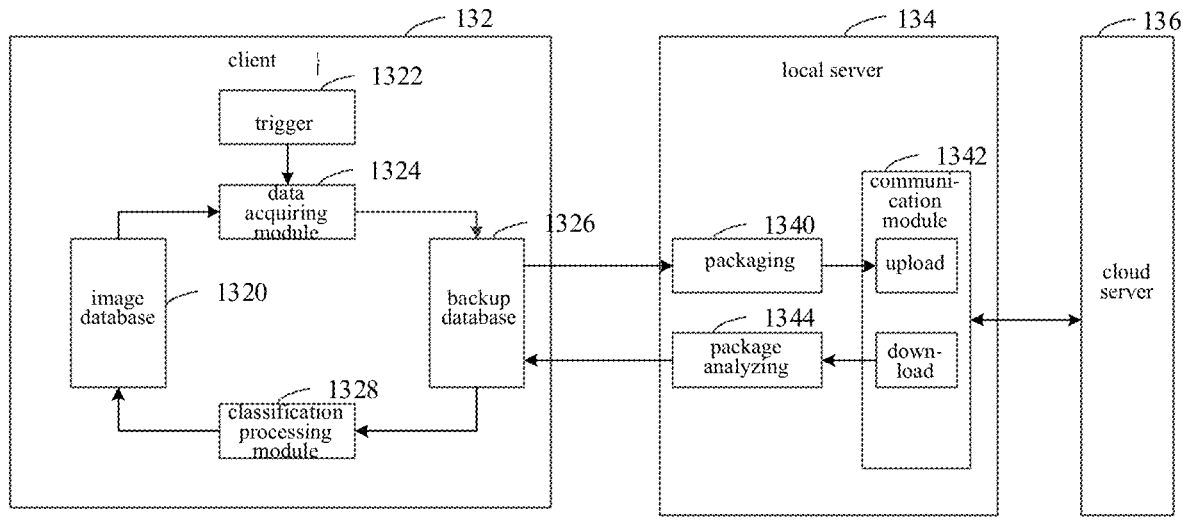
FIG. 13 is a schematic diagram illustrating system architecture of an image processing system in an embodiment.

FIG. 13 is a schematic diagram illustrating system architecture of an image processing system in an embodiment. As illustrated in FIG. 13, the image processing system includes a client 132, a local server 134 and a cloud server 136. The working of the system architecture includes two phases: the image synchronization phase and the image classification phase. In the image synchronization phase, the trigger 1322 may initiate the synchronization request, and then the data acquiring module 1324 acquires the first images from the image database 1320 and stores the acquired first images in the backup database 1326, and the backup database 1326 sends the first images to the local server 134. The local server 134 packages the first images through the packaging module 1340 and uploads the packaged first images to the cloud server 136 through the communication module 1342. The cloud server receives the first images, generates the first image set and stores the first image set. In the image classification phase, the trigger 1322 may initiate the classification request, and then the data acquiring module 1324 acquires the first image from the image database 1320, and stores the first image in the backup database 1326. The classification processing module 1328 compresses the first image to generate the second image, performs face recognition on the second image, and stores the obtained second image and corresponding second face image and second face coordinate in the backup database 1326. The cloud server 136 performs face recognition on the first image to obtain the first face image and the first face coordinate, and send the first face image and the first face coordinate to the local server 134 when the client 132 is connected to network. The local server 134 receives the first face image and corresponding first face coordinate through the communication module 1342, analyzes the first face image and corresponding first face coordinate through the package analyzing module 1344, and sends the first face image and the first face coordinate to the client 132 for storing in the backup database 1326. Then, the classification processing module 1328 generates the face image set according to the first face image, the second face image, the first face coordinate and the second face coordinate, and classifies the first image and/or the second image according to the face image set.

Figure 14:
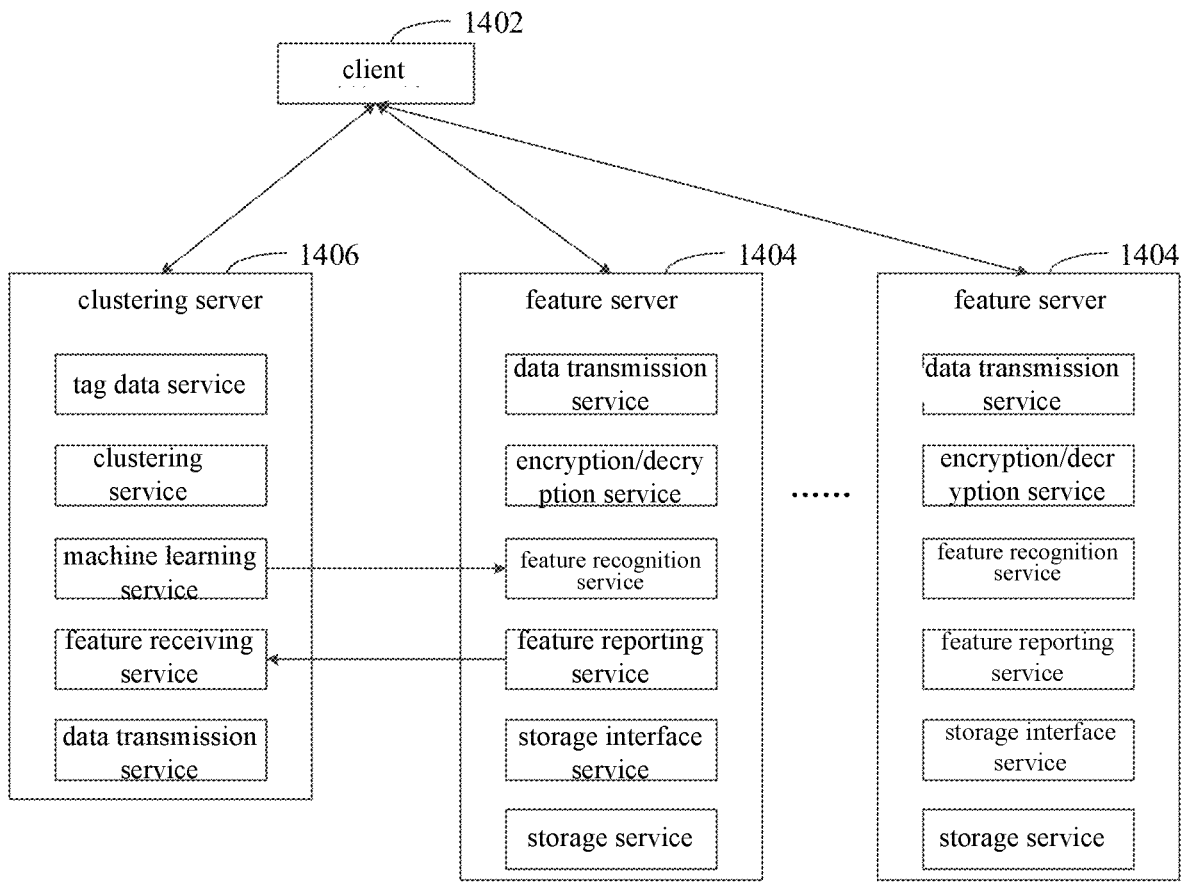
FIG. 14 is a schematic diagram illustrating system architecture of an image processing system in another embodiment.

FIG. 14 is a schematic diagram illustrating system architecture of an image processing system in another embodiment. As illustrated in FIG. 14, the image processing system includes a client 1402, a feature server 1404 and a clustering server 1406.

The client 1402 is configured to acquire the first image, compress the first image to generate the second image, and perform face recognition on the second image to obtain the second face image, the second face coordinate and the second classification identification; send the first image to the feature server 1404, and receive the first face image, the first face coordinate and the first classification identification returned by the clustering server 1406; calculate the magnification ratio according to the image size of the first image and the image size of the second image, calculates the second target face coordinate according to the magnification ratio and the second face coordinate; compare the first face coordinate with the second target face coordinate to obtain the comparing result; and perform face clustering according to the comparing result.

The feature server 1404 is configured to receive the first image sent by the client 1402, perform feature recognition on the first image to obtain the first face image and the first face coordinate, and send the first face image and the first face coordinate to the clustering server 1406.

In embodiments provided by the present disclosure, the feature server 1404 may be a server cluster, such that distributed feature recognition processing may be realized via a plurality of servers. The feature server may provide, but not limited to, data transmission service, encryption and decryption service, feature recognition service, feature reporting service, storage interface service and storage service. The data transmission service is used to transmit data, for example, receive the first image sent by the client or send the first face image and the first face coordinate to the client through IO Service. It may be understood, the first face image and the first face coordinate may be sent by the feature server 1404 to the client 1402, or may be sent by the clustering server 1406 to the client 1402. The encryption and decryption service is used to encrypt and decrypt data. For example, the encryption and decryption service may be Privacy service, and the first image is encrypted with the Privacy service. The feature recognition service refers to the service which provides feature recognition processing, for example, extracts the first face image in the first image. The feature reporting service is used to report the first face image and the first face coordinate to the clustering server. The storage service is the service for storing data, for example, storing the first image in the feature server. The storage interface service refers to the service which interfaces with the storage service.

The clustering server 1406 is configured to receive the first face image and the first face coordinate sent by the feature server 1404, perform clustering process according to the first face image and the first face coordinate to obtain the first classification identification, and send the first face image, the first face coordinate and the first classification identification to the client 1402.

In an embodiment, the clustering server 1406 may include, but not limited to, tag data service, clustering service, feature receiving service, machine learning service and data transmission service. The tag data service refers to the service which generates the tag data, for example, generates the tag data according to the first classification identification. The clustering service refers to the service which performs clustering process on the data set, for example, performs clustering process on the first face image. The feature receiving service is used to receive the first face image and the first face coordinate reported by the feature server. The clustering server may further train the training image set to obtain a clustering model and a feature recognition model, perform clustering process on the clustering feature set according to the clustering model, and send the feature recognition model to the feature server for extracting the first face image in the first image. The machine learning service refers to the service which provides the model training, for example, obtains the clustering model and the feature recognition model from training the training image set. The data transmission service refers to the service which provides data transmission. For example, the clustering result is pushed to the client through the PUSH method.

Figure 15:
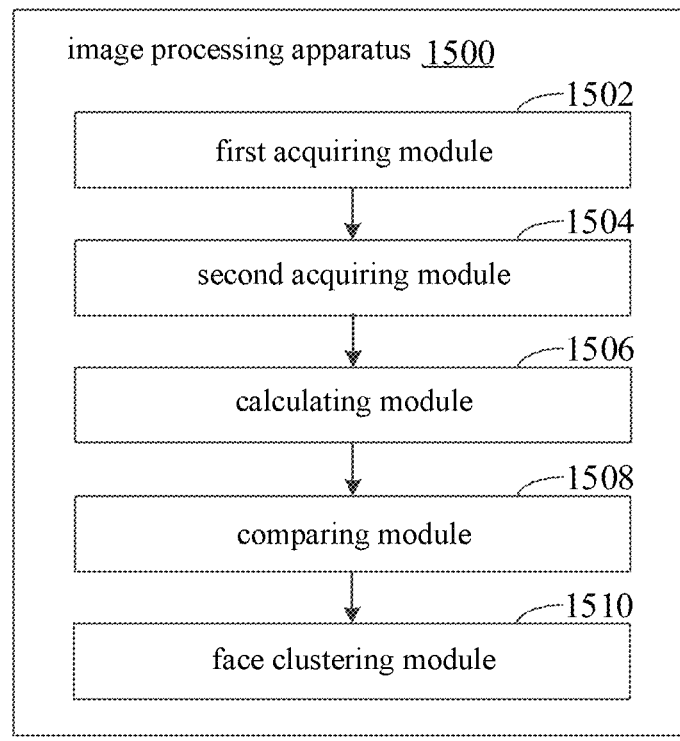
FIG. 15 is a block diagram of an image processing apparatus in an embodiment.

FIG. 15 is a block diagram of an image processing apparatus in an embodiment. As illustrated in FIG. 15, the image processing apparatus 1500 includes a first acquiring module 1502, a second acquiring module 1504, a calculating module 1506, a comparing module 1508 and a face clustering module 1510.

The first acquiring module 1502 is configured to acquire a first face coordinate of a first image, in which the first face coordinate is configured to represent a position of a first face image in the first image.

The second acquiring module 1504 is configured to acquire a second face coordinate of a second image, in which the second face coordinate is configured to represent a position of a second face image in the second image, the first image has a different resolution from the second image, and an image size of the first image is greater than an image size of the second image.

The calculating module 1506 is configured to calculate a magnification ratio according to the image size of the first image and the image size of the second image, and calculate a second target face coordinate according to the magnification ratio and the second face coordinate.

The comparing module 1508 is configured to compare the first face coordinate with the second target face coordinate to obtain a comparing result.

The face clustering module 1510 is configured to perform face clustering according to the comparing result.

With the image processing apparatus provided by foregoing embodiments, the first image and the second image having different resolutions are acquired, the magnification ratio is calculated according to the image size of the first image and the image size of the second image, the second face coordinate is processed according to the magnification ratio to obtain the second target face coordinate, and the first face coordinate is compared with the second target face coordinate to obtain the relationship of the first face image and the second face image, and face clustering is performed according to the comparing result. In this way, recognition results of two images with different resolutions may be compared by placing the two images in the same coordinate system and determining the relationship of face images according to the face coordinates, such that the comparing result is more accurate, which improves accuracy of image processing.

In an embodiment, the first acquiring module 1502 is further configured to perform face recognition on the first image to obtain the first face image and the first face coordinate.

In an embodiment, the second acquiring module 1504 is further configured to perform face recognition on the second image to obtain the second face image and the second face coordinate, in which the second image is obtained from compressing the first image.

In an embodiment, the calculating module 1506 is further configured to calculate a ratio of a width of the first image to a width of the second image to obtain a first magnification ratio, calculate a ratio of a height of the first image to a height of the second image to obtain a second magnification ratio, and select the first magnification ratio or the second magnification ratio as the magnification ratio.

In an embodiment, the calculating module 1506 is further configured to select the first magnification ratio as the magnification ratio when the first magnification ratio is greater than or equal to the second magnification ratio, and select the second magnification ratio as the magnification ratio when the first magnification ratio is less than the second magnification ratio.

In an embodiment, the calculating module 1506 is further configured to multiply the horizontal coordinate of the second face coordinate by the magnification ratio to obtain the horizontal coordinate of the second target face coordinate, and multiply the vertical coordinate of the second face coordinate by the magnification ratio to obtain the vertical coordinate of the second target face coordinate.

In an embodiment, the comparing module 1508 is further configured to determine a position relationship of the first face image and the second target face image according to the first face coordinate and the second target face coordinate, in which the second target face image is obtained by magnifying the second face image with the magnification ratio; and determine whether the first face image and the second face image correspond to the same face according to the position relationship.

In an embodiment, the comparing module 1508 is further configured to: when the first face image and the second target face image have an overlapping relationship, determine that the first face image and the second face image correspond to the same face; when the first face image and the second target face image have an inclusion relationship, calculate a face size ratio according to a face size of the first face image and a face size of the second target face image, and determine whether the first face image and the second face image correspond to the same face according to the face size ratio; when the first face image and the second target face image have an intersection relationship, calculate a face area ratio according to a face area of the first face image and a face area of the second target face image, and determine whether the first face image and the second face image correspond to the same face according to the face area ratio; when the first face image and the second target face image have a separation relationship, determine that the first face image and the second face image correspond to different faces.

In an embodiment, the comparing module 1508 is further configured to: calculate a first face size ratio according to a face width of the first face image and a face width of the second target face image; calculate a second face size ratio according to a face height of the first face image and a face height of the second target face image; and select the first face size ratio or the second face size ratio as the face size ratio.

In an embodiment, the comparing module 1508 is further configured to select the second face size ratio as the face size ratio when the first face size ratio is greater than or equal to the second face size ratio, and select the first face size ratio as the face size ratio when the first face size ratio is less than the second face size ratio.

In an embodiment, the comparing module 1508 is further configured to determine that the first face image and the second face image correspond to the same face when the face size ratio is greater than a size ratio threshold.

In an embodiment, the comparing module 1508 is further configured to acquire an area of an intersection of the first face image and the second target face image as a first face area, acquire an area of a union of the first face image and the second target face image as a second face area, and calculate the face area ratio according to the first face area and the second face area.

In an embodiment, the comparing module 1508 is further configured to determine that the first face image and the second face image correspond to the same face when the face area ratio is greater than an area ratio threshold.

In an embodiment, the face clustering module 1510 is further configured to generate a face image set based on the first face image when the first face image and the second face image correspond to the same face, and generate the face image set based on the first face image and the second face image when the first face image and the second face image correspond to different faces.

In an embodiment, the face clustering module 1510 is further configured to classify the first image and/or the second image according to the face image set.

Division of respective modules in the image processing apparatus described above is merely used for illustration. In other embodiments, the image processing apparatus may be divided into different modules based on demands, to implement all or part of functions of the image processing apparatus described above.

Figure 16:
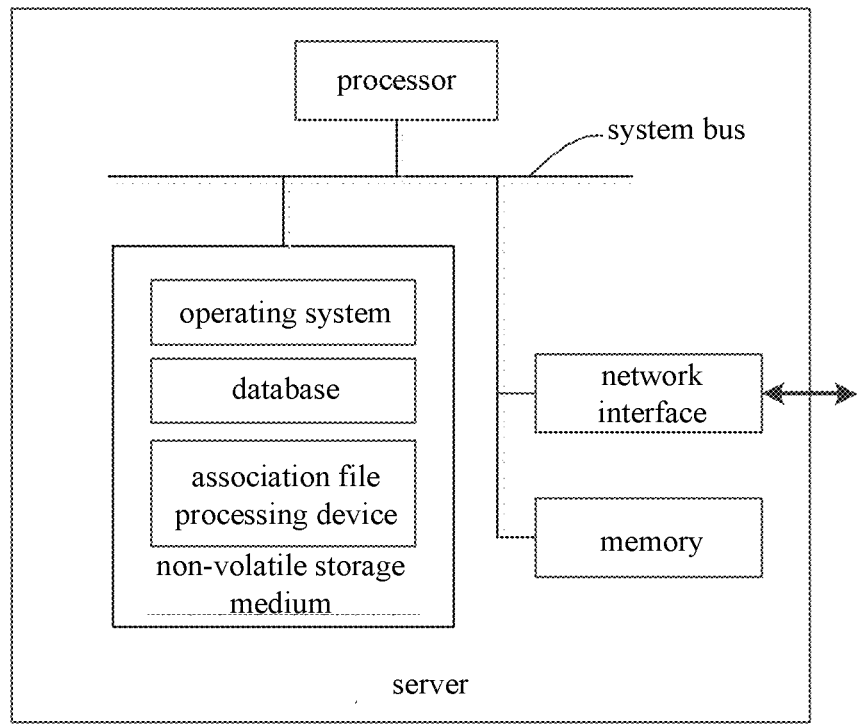
FIG. 16 is a block diagram of a server in an embodiment.

FIG. 16 is a block diagram of a server in an embodiment. As illustrated in FIG. 16, the server includes a processor, a non-volatile storage medium, a memory and a network interface connected via a system bus. The processor is configured to provide computing and control capability, supporting work of the whole server. The storage is configured to store data and programs and the like. The storage is stored with at least one computer programs. The computer programs may be executed by the processor, to implement the image processing method provided by embodiments of the present disclosure. The storage may include a non-volatile storage medium such as a disk, a CD and a ROM (read-only memory), or a RAM (random access memory). For example, in an embodiment, the storage includes the non-volatile storage medium and the memory. The non-volatile storage medium is stored with the operating system and computer programs that, when executed by the processor, implement any image processing method provided by embodiments of the present disclosure. The memory provides environment for running of computer programs in the non-volatile storage medium. The network interface may be an Ethernet card or a wireless card, and is configured to communicate with the external computer device. The server may be implemented by a single server or by a server cluster consisting of multiple servers. Those skilled in the art will understand, FIG. 16 merely illustrates a part of the server relevant to the present disclosure, which does not constitute limitation to the server to which technical solutions of the present disclosure are applied. The server may include more or less components than illustrated in the drawings, or may combine some components, or may have different component arrangements.

Embodiments of the present disclosure further provide a computer readable storage medium. The computer readable storage medium is stored with computer executable instructions. When the computer executable instructions are executed by the processor, the processor is caused to implement the image processing method provided by foregoing embodiments.

A computer program product having instructions is also provided. When the computer program product is running on a computer, the computer is caused to implement the image processing method provided by foregoing embodiments.

Figure 17:
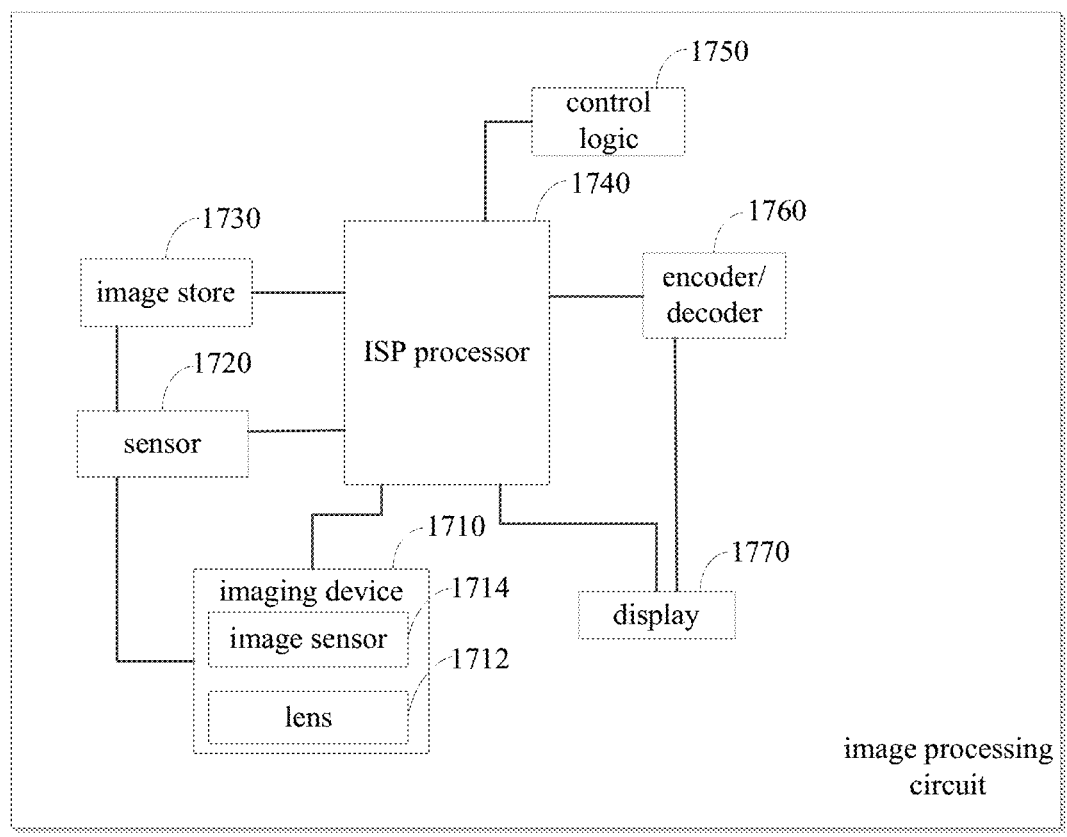
FIG. 17 is a schematic diagram of an image processing circuit in an embodiment.

Embodiments of the present disclosure further provide a computer device. The computer device includes an image processing circuit. The image processing circuit may be implemented by hardware components and/or software components, and may include various processing units defining ISP (image signal processing) pipelines. FIG. 17 is a schematic diagram of an image processing circuit in an embodiment. As illustrated in FIG. 17, for convenience of description, only aspects of the image processing technology related to embodiments of the present disclosure are illustrated.

As illustrated in FIG. 17, the image processing circuit includes an ISP processor 1740 and control logic 1750. The image data captured by the imaging device 1710 is first processed by the ISP processor 1740. The ISP processor 1740 analyzes the image data to capture image statistics information which can be used to determine one or more control parameters of the imaging device 1710. The imaging device 1710 may include a camera having one or more lenses 1712 and an image sensor 1714. The image sensor 1714 may include a color filter array (for example, Bayer filter). The image sensor 1714 may acquire light strength and wavelength information captured by each imaging pixel of the image sensor 1714, and provide a set of original image data which can be processed by the ISP processor 1740. The sensor 1720 (for example, gyroscope) may provide collected parameters for image processing (for example, anti-shake parameter) to the ISP processor 1740 based on a type of an interface of the sensor 1720. The interface of the sensor 1720 may adopt a SMIA (standard mobile imaging architecture) interface, other serial or parallel camera interface or a combination thereof.

In addition, the image sensor 1714 may also send the original image data to the sensor 1720. The sensor 1720 provide the original image data to the ISP processor 1740 based on the type of the interface of the sensor 1720, or the sensor 1720 stores the original image data in the image store 1730.

The ISP processor 1740 processes the original image data pixel-by-pixel in a variety of modes. For example, each image pixel may have a bit depth of 8, 10, 12 or 14 bits, and the ISP processor 1740 may perform one or more image processing operation on the original image data, and collect statistics information about the image data, in which the image processing operations may be performed according to same or different bit depth precision.

The ISP processor 1740 may further receive the image data from the image store 1730. For example, the sensor 1720 sends the original image data to the image store 1730 via the interface, and the image store 1730 provides the original image data stored therein to the ISP processor 1740 for processing. The image store 1730 may be a part of a storage apparatus, a storage device, a separate privacy memory in an electronic device, and may include DMA (direct memory access) feature.

When receiving the original image data from the interface of the image sensor 1714 or from the interface of the sensor 1720 or from the image store 1730, the ISP processor 1740 may perform one or more image processing operation, for example, time-domain filtering. The processed image data may be sent to the image store 1730, so as to be subject to further processing before display. The ISP processor 1740 receives the processed data from the image store 1730, and performs image data processing on the processed data in the primitive domain and in RGB and YCbCr color space. After processing, the ISP processor 1740 may output the image data to the display 1770, for view by the user and/or further processing by the graphics engine or GPU (graphics processing unit). In addition, the output of the ISP processor 1740 may be sent to the image store 1730, and the display 1770 may read image data from the image store 1730. In an embodiment, the image store 1730 may be configured to implement one or more frame buffer. In addition, the output of the ISP processor 1740 may be sent to the encoder/decoder 1760, for encoding/decoding image data. The encoded image data may be saved, and decoded before displaying on the display 1770. The encoder/decoder 1760 may be implemented by CPU or GPU or co-processor.

The statistics data determined by the ISP processor 1740 may be sent to the control logic 1750. For example, the statistics data may include statistics information of the image sensor 1714 such as automatic exposure, automatic white balance, auto-focus, scintillation detection, black level compensation, and shading correction of the lens 1712. The control logic 1750 may include a processor and/or a microcontroller executing one or more routines (for example, firmware), in which the one or more routines may determine control parameters of the imaging device 1710 and control parameters of the ISP processor 1740 according to received statistics data. For example, the control parameters of the imaging device 1710 may include control parameters of the sensor 1720 (for example, gain, integral time of exposure control, and anti-shaking parameter, and the like), flash control parameter of the camera, control parameters of the lens 1712 (for example, focal length) or combination of these parameters. The control parameters of the ISP processor 1740 may include gain level and color correction matrix used for automatic white balance and color adjustment (for example, during RGB processing), and the shading correction parameter of the lens 1712.

Any reference to the memory, the storage, the database, or any other medium as used herein may include a non-volatile memory and/or a volatile memory. The suitable non-volatile memory may include a ROM, a programmable ROM (PROM), an electrically programmable (EPROM), an electrically erasable programmable ROM (EEPROM) and a flash memory. The volatile memory may include a RAM, which is used as an external cache. As illustration and without limitation, RAM may be implemented in may forms, such as static RAM (SRAM), dynamic RAM (DRAM), synchronic DRAM (SDRAM), double data rate SDRAM (DDR SDRAM), enhanced SDRAM (ESDRAM), synchlink DRAM (SLDRAM), memory bus (Rambus), direct RAM (RDRAM), direct memory bus dynamic RAM (DRDRAM), and memory bus dynamic RAM (RDRAM).

Above embodiments merely illustrate some implementations of the present disclosure, which are described specifically and in detail, but do not constitute limitation to the scope of the present disclosure. It is to be noted that, those skilled in the art may make several modification and change without departing from the concept of the present disclosure, and these modification and change belong to the protection scope of the present disclosure. Thus, the protection scope of the present disclosure is defined by appending claims.

What is claimed is:

1. An image processing method, comprising:
    acquiring a first face coordinate of a first image, wherein the first face coordinate is configured to represent a position of a first face image in the first image, and the first face image is an image of one of a plurality of first faces contained in the first image;
    acquiring a second face coordinate of a second image, wherein the second image is obtained by compressing the first image, the second face coordinate is configured to represent a position of a second face image in the second image, the second face image is an image of one of a plurality of second faces contained in the second image, the first image has a different resolution from the second image, and an image size of the first image is greater than an image size of the second image;
    calculating a magnification ratio according to the image size of the first image and the image size of the second image, and calculating a second target face coordinate according to the magnification ratio and the second face coordinate;
    comparing the first face coordinate with the second target face coordinate by converting the first face coordinate and the second target face coordinate into a same coordinate system, to obtain a comparing result; and
    generating a face image set including: adding one of the first face image cut from the first image and the second face image cut from the second image in the face image set, in a case that the comparing result indicates that the first face image and the second face image correspond to the same face; and adding both the first face image cut from the first image and the second face image cut from the second image in the face image set, in a case that the comparing result indicates that the first face image and the second face image correspond to different faces.

2. The method according to claim 1, wherein acquiring the first face coordinate of the first image comprises:
    performing face recognition on the first image to obtain the first face image and the corresponding first face coordinate.

3. The method according to claim 1, wherein acquiring the second face coordinate of the second image comprises:
performing face recognition on the second image to obtain the second face image and the corresponding second face coordinate.

4. The method according to claim 1, wherein calculating the magnification ratio according to the size of the first image and the size of the second image comprises:
calculating a ratio of a width of the first image to a width of the second image to obtain a first magnification ratio;
calculating a ratio of a height of the first image to a height of the second image to obtain a second magnification ratio; and
selecting the first magnification ratio or the second magnification ratio as the magnification ratio.

5. The method according to claim 1, wherein comparing the first face coordinate with the second target face coordinate to obtain a comparing result comprises:
determining a position relationship of the first face image and a second target face image according to the first face coordinate and the second target face coordinate, wherein the second target face image is obtained by magnifying the second face image with the magnification ratio; and
determining whether the first face image and the second face image correspond to the same face according to the position relationship.

6. The method according to claim 5, wherein determining whether the first face image and the second face image correspond to the same face according to the position relationship comprises:
when the first face image and the second target face image have an overlapping relationship, determining that the first face image and the second face image correspond to the same face; or
when the first face image and the second target face image have an inclusion relationship, calculating a face size ratio according to a face size of the first face image and a face size of the second target face image, and determining whether the first face image and the second face image correspond to the same face according to the face size ratio; or
when the first face image and the second target face image have an intersection relationship, calculating a face area ratio according to a face area of the first face image and a face area of the second target face image, and determining whether the first face image and the second face image correspond to the same face according to the face area ratio; or
when the first face image and the second target face image have a separation relationship, determining that the first face image and the second face image correspond to different faces.

7. The method according to claim 6, wherein calculating the face size ratio according to the face size of the first face image and the face size of the second target face image comprises:
calculating a first face size ratio according to a face width of the first face image and a face width of the second target face image;
calculating a second face size ratio according to a face height of the first face image and a face height of the second target face image; and
selecting the first face size ratio or the second face size ratio as the face size ratio.

8. The method according to claim 6, wherein calculating the face area ratio according to the face area of the first face image and the face area of the second target face image comprises:
acquiring an area of an intersection of the first face image and the second target face image as a first face area;
acquiring an area of a union of the first face image and the second target face image as a second face area; and
calculating the face area ratio according to the first face area and the second face area.

9. The method according to claim 6, wherein
determining whether the first face image and the second face image correspond to the same face according to the face size ratio comprises:
when the face size ratio is greater than a size ratio threshold, determining that the first face image and the second face image correspond to the same face;
determining whether the first face image and the second face image correspond to the same face according to the face area ratio comprises:
when the face area ratio is greater than an area ratio threshold, determining that the first face image and the second face image correspond to the same face.

10. An image processing apparatus, comprising:
a processor; and
a memory, configured to store instructions executable by the processor,
wherein the processor is configured to run a program corresponding to the instructions by reading the instructions stored in the memory, so as to:
acquire a first face coordinate of a first image, wherein the first face coordinate is configured to represent a position of a first face image in the first image, and the first face image is an image of one of a plurality of first faces contained in the first image;
acquire a second face coordinate of a second image, wherein the second image is obtained by compressing the first image, the second face coordinate is configured to represent a position of a second face image in the second image, the second face image is an image of one of a plurality of second faces contained in the second image, the first image has a different resolution from the second image, and an image size of the first image is greater than an image size of the second image;
calculate a magnification ratio according to the image size of the first image and the image size of the second image, and calculate a second target face coordinate according to the magnification ratio and the second face coordinate;
compare the first face coordinate with the second target face coordinate by converting the first face coordinate and the second target face coordinate into a same coordinate system, to obtain a comparing result; and
generate a face image set including: adding one of the first face image cut from the first image and the second face image cut from the second image in the face image set, in a case that the comparing result indicates that the first face image and the second face image correspond to the same face; and adding both the first face image cut from the first image and the second face image cut from the second image in the face image set, in a case that the comparing result indicates that the first face image and the second face image correspond to different faces.

11. The apparatus according to claim 10, wherein the processor is configured to:
perform face recognition on the first image to obtain the first face image and the corresponding first face coordinate.

12. The apparatus according to claim 10, wherein the processor is configured to:
perform face recognition on the second image to obtain the second face image and the corresponding second face coordinate.

13. The apparatus according to claim 10, wherein the processor is configured to:
calculate a ratio of a width of the first image to a width of the second image to obtain a first magnification ratio;
calculate a ratio of a height of the first image to a height of the second image to obtain a second magnification ratio; and
select the first magnification ratio or the second magnification ratio as the magnification ratio.

14. The apparatus according to claim 10, wherein the processor is configured to:
determine a position relationship of the first face image and a second target face image according to the first face coordinate and the second target face coordinate, wherein the second target face image is obtained by magnifying the second face image with the magnification ratio; and
determine whether the first face image and the second face image correspond to the same face according to the position relationship.

15. The apparatus according to claim 14, wherein the processor is configured to:
when the first face image and the second target face image have an overlapping relationship, determine that the first face image and the second face image correspond to the same face; or
when the first face image and the second target face image have an inclusion relationship, calculate a face size ratio according to a face size of the first face image and a face size of the second target face image, and determine whether the first face image and the second face image correspond to the same face according to the face size ratio; or
when the first face image and the second target face image have an intersection relationship, calculating a face area ratio according to a face area of the first face image and a face area of the second target face image, and determining whether the first face image and the second face image correspond to the same face according to the face area ratio; or
when the first face image and the second target face image have a separation relationship, determining that the first face image and the second face image correspond to different faces.

16. The apparatus according to claim 15, wherein the processor is configured to:
calculate a first face size ratio according to a face width of the first face image and a face width of the second target face image;
calculate a second face size ratio according to a face height of the first face image and a face height of the second target face image; and
select the first face size ratio or the second face size ratio as the face size ratio.

17. The apparatus according to claim 15, wherein the processor is configured to:
acquire an area of an intersection of the first face image and the second target face image as a first face area;
acquire an area of a union of the first face image and the second target face image as a second face area; and
calculate the face area ratio according to the first face area and the second face area.

18. The apparatus according to claim 15, wherein the processor is configured to:
when the face size ratio is greater than a size ratio threshold, determine that the first face image and the second face image correspond to the same face; and
when the face area ratio is greater than an area ratio threshold, determine that the first face image and the second face image correspond to the same face.

19. An electronic device, comprising:
a processor;
a memory, configured to store instructions executable by the processor; and
a display,
wherein the processor is configured to run a program corresponding to the instructions by reading the instructions stored in the memory, so as to:
send a first image to a server, and receive a first face image and a first face coordinate from the server, the first face coordinate being configured to represent a position of the first face image in the first image, and the first face image being an image of one of a plurality of first faces contained in the first image;
compress the first image to obtain a second image, and perform face recognition on a second image to obtain a second face image and a second face coordinate, the second face coordinate being configured to represent a position of the second face image in the second image, the second face image is an image of one of a plurality of second faces contained in the second image;
calculate a magnification ratio according to an image size of the first image and an image size of the second image, and calculate a second target face coordinate according to the magnification ratio and the second face coordinate;
compare the first face coordinate with the second target face coordinate by converting the first face coordinate and the second target face coordinate into a same coordinate system, to obtain a comparing result; and
generate a face image set, including: adding one of the first face image cut from the first image and the second face image cut from the second image in the face image set, in a case that the comparing result indicates that the first face image and the second face image correspond to the same face; and adding both the first face image cut from the first image and the second face image cut from the second image in the face image set, in a case that the comparing result indicates that the first face image and the second face image correspond to different faces,
wherein the display is configured to display classification result.

* * * * *